US012558812B2

(12) United States Patent
Knop

(10) Patent No.: US 12,558,812 B2
(45) Date of Patent: Feb. 24, 2026

(54) MOBILE VOLUMETRIC CONCRETE-PRODUCTION SYSTEM

(71) Applicant: Sensolyzer Advanced Sensing Systems Ltd., Herzliya (IL)

(72) Inventor: Yaniv Knop, Herzliya (IL)

(73) Assignee: Sensloyzer Advanced Sensing Systems Ltd., Herzliya (IL)

( * ) Notice: Subject to any disclaimer, the term of this patent is extended or adjusted under 35 U.S.C. 154(b) by 371 days.

(21) Appl. No.: 18/514,023

(22) Filed: Nov. 20, 2023

(65) Prior Publication Data

US 2024/0083068 A1     Mar. 14, 2024

Related U.S. Application Data

(63) Continuation-in-part of application No. PCT/IL2022/050173, filed on Feb. 14, 2022.
(Continued)

(51) Int. Cl.
 *G01N 21/88* (2006.01)
 *B28C 5/42* (2006.01)
(52) U.S. Cl.
 CPC ......... *B28C 5/422* (2013.01); *G01N 21/8851* (2013.01); *G01N 2021/8887* (2013.01)
(58) Field of Classification Search
 CPC ....... B28C 5/422; B28C 7/026; B28C 7/0418; B28C 7/0007; B28C 7/028; B28C 7/0409;
 (Continued)

(56) References Cited

U.S. PATENT DOCUMENTS

| | | | | |
|---|---|---|---|---|
| 11,312,039 B1 * | 4/2022 | Chapdelaine | ........... | B28C 5/422 |
| 12,032,350 B2 * | 7/2024 | Brockhurst | ............ | G06N 5/025 |

(Continued)

FOREIGN PATENT DOCUMENTS

| | | | | |
|---|---|---|---|---|
| CA | 3038081 A1 * | 3/2018 | ........... | B28C 7/0418 |
| EP | 3515874 A1 | 7/2019 | | |

(Continued)

OTHER PUBLICATIONS

International Search Report of PCT/IL2022/050173 Completed Oct. 19, 2022; Mailed Oct. 25, 2022 7 pages.
(Continued)

*Primary Examiner* — Andre J Allen
(74) *Attorney, Agent, or Firm* — The Roy Gross Law Firm, LLC; Roy D. Gross

(57) ABSTRACT

A quality control system of the invention allows controlling, image analysis and continuous visual monitoring of aggregates and sand processing, and physical properties and workability of fresh concrete and concrete mixes, which are manufactured from the aggregates and sand, and then transported to construction sites and used there for construction purposes. The system of the invention comprises visual monitoring devices (100), stationary or mobile, installed or remotely used at quarries, concrete plants, in concrete trucks and at the construction sites. The method for continuous visual monitoring of the aggregates, sand and concrete is based on image or video processing and analysis of the aggregates and sand, fresh concrete, concrete mixes or precast concrete, the concrete slump levels, segregation and bleeding, homogeneity of the mixture and consistency.

20 Claims, 12 Drawing Sheets
(9 of 12 Drawing Sheet(s) Filed in Color)

Related U.S. Application Data

(60) Provisional application No. 63/192,693, filed on May 25, 2021.

(58) Field of Classification Search
CPC ....... G01N 2021/8887; G01N 21/8851; G01N 33/383; G05B 13/0265; G06T 2207/30132; G06T 7/0004; G06T 7/62
See application file for complete search history.

(56) References Cited

U.S. PATENT DOCUMENTS

| | | |
|---|---|---|
| 2015/0298351 A1 | 10/2015 | Beaupre |
| 2022/0402167 A1 * | 12/2022 | Walsworth ............ B28C 9/0409 |

FOREIGN PATENT DOCUMENTS

| | | | | |
|---|---|---|---|---|
| JP | 2016068530 A | | 5/2016 | |
| JP | 6764982 B1 | | 10/2020 | |
| JP | 2021020425 A | * | 2/2021 | |
| KR | 101936218 B1 | | 1/2019 | |
| WO | 20201111370 A1 | | 6/2020 | |
| WO | WO-2020161589 A1 | * | 8/2020 | ........... B28C 9/0463 |

OTHER PUBLICATIONS

Written Opioin of PCT/IL2022/050173 Completed Oct. 19, 2022; Mailed Oct. 25, 2022 12 pages.

* cited by examiner

Fig. 4
Fig. 6
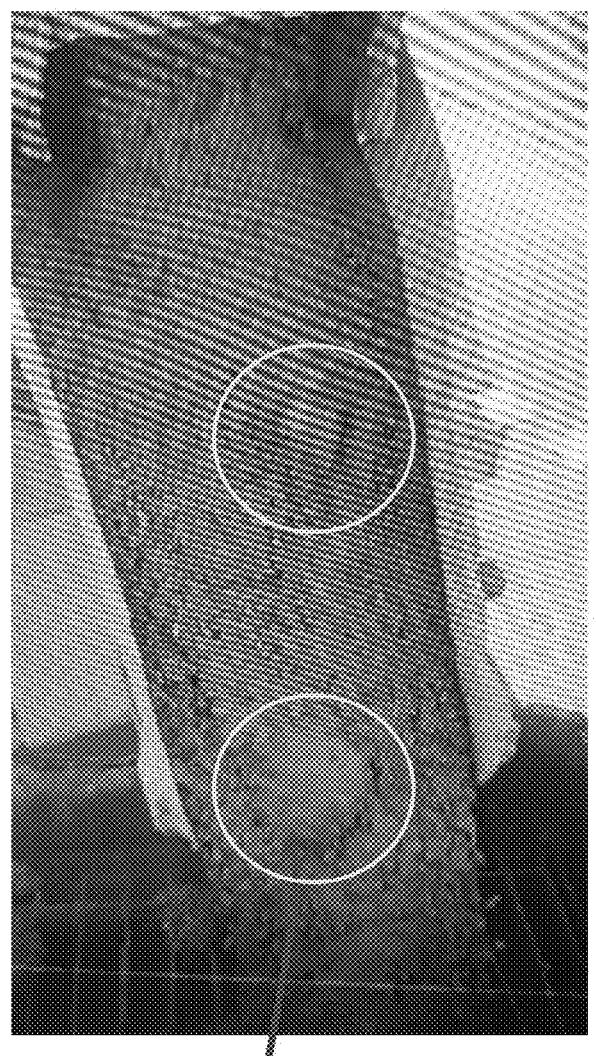
Unmixed concrete lumps
in a non-homogeneous
concrete mixture

Fig. 5

Grade 147

Size (mm)

Grade 147

Size (mm)

Grade 114

Size (mm)

Grade 114

Size (mm)

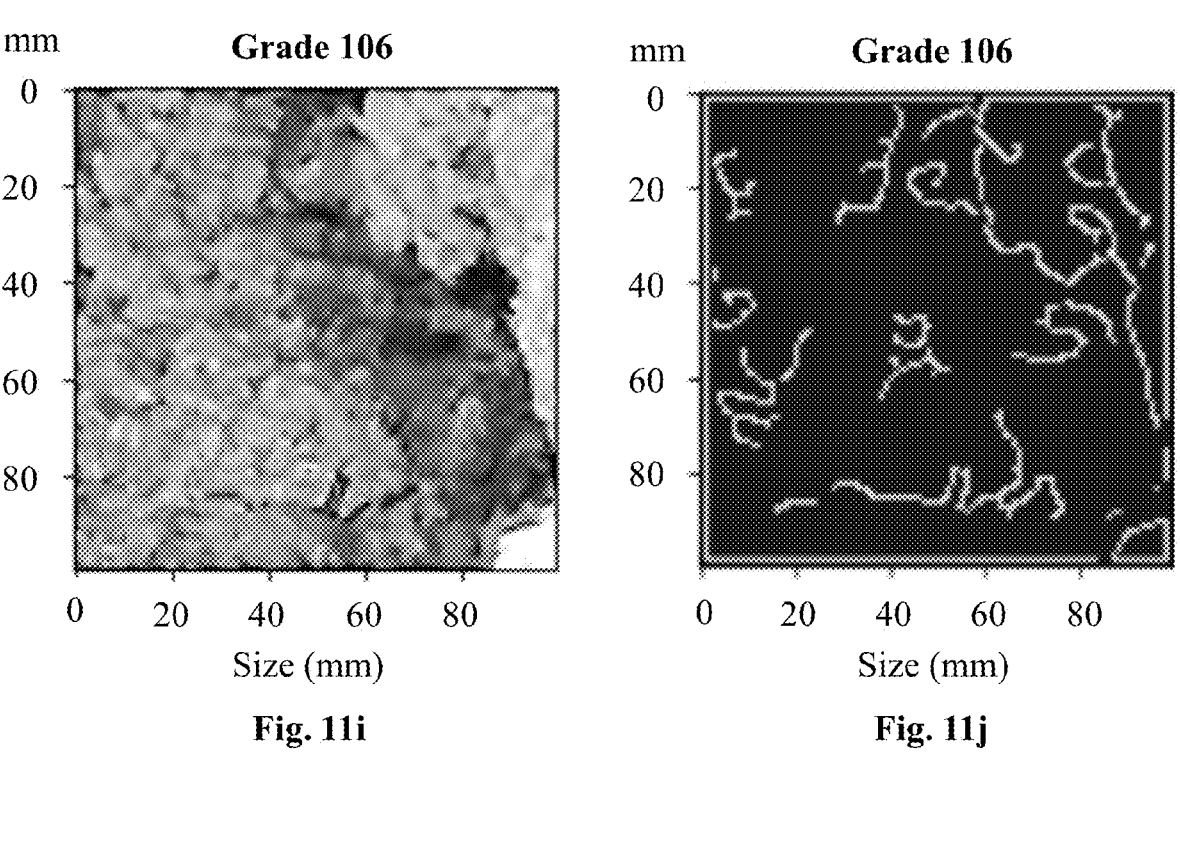
Fig. 11i
Fig. 11j
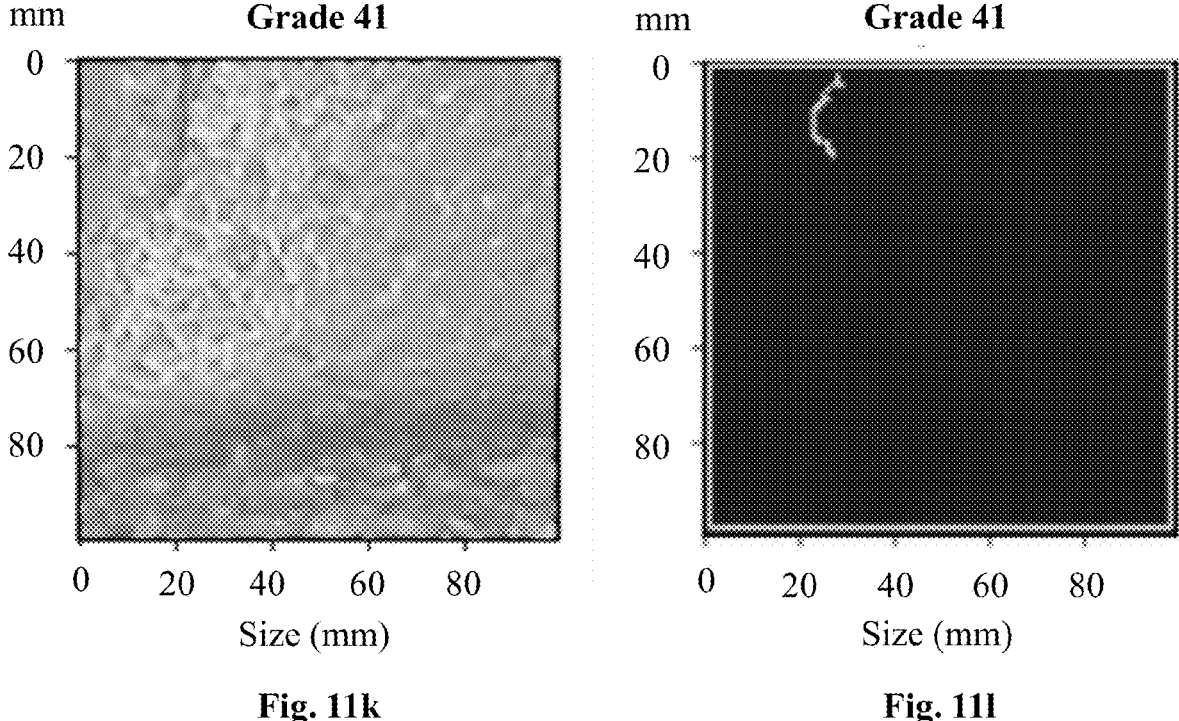
Fig. 11k
Fig. 11l

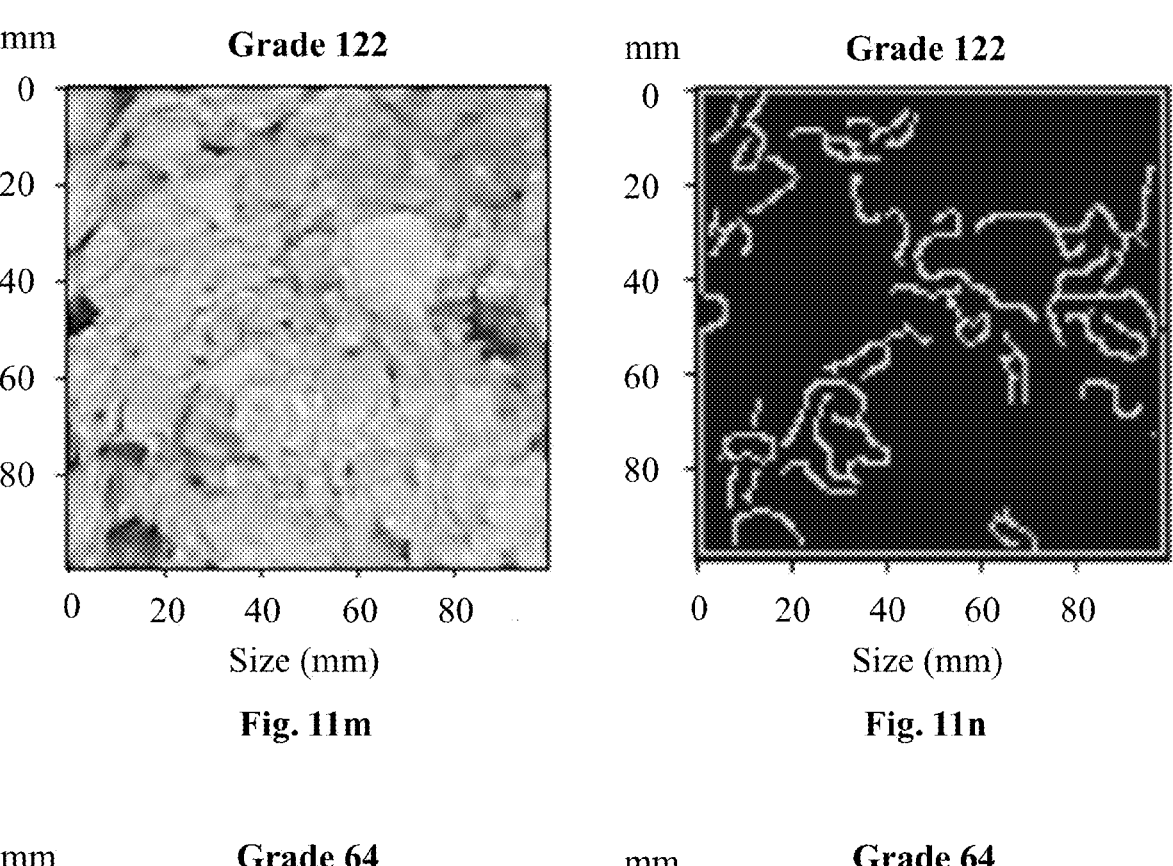
Fig. 11m
Fig. 11n
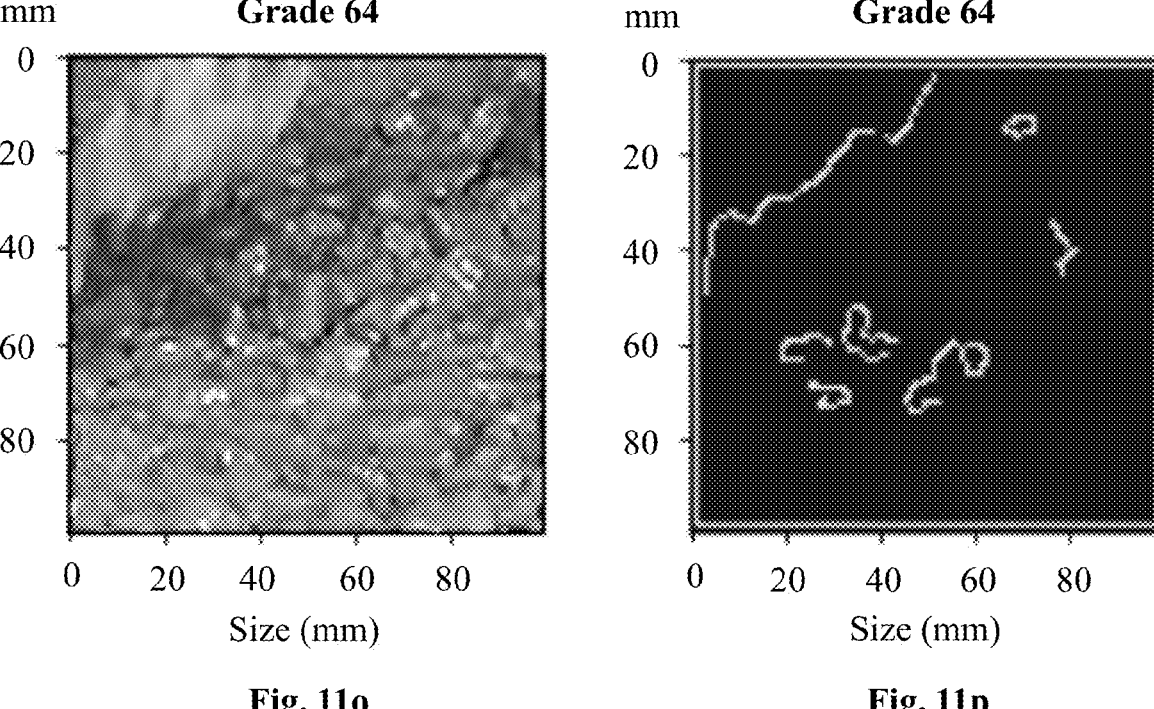
Fig. 11o
Fig. 11p

MOBILE VOLUMETRIC CONCRETE-PRODUCTION SYSTEM

CROSS REFERENCE TO RELATED APPLICATIONS

This application is a Continuation-in-part of PCT Patent Application No. PCT/IL2022/050173 having International filing date of Feb. 14, 2022, which claims the benefit of priority of U.S. Provisional Patent Application No. 63/192,693, filed May 25, 2021, the contents of which are all incorporated herein by reference in their entirety.

TECHNICAL FIELD

The present application relates to the field of continuous production, monitoring and quality control of fresh concrete or batched concrete mix.

BACKGROUND

Concrete is the most widely used construction material around the world. It is a composite material with a complex structure composed of water, fine aggregates, coarse aggregates, sand, chemical additives, and various chemical admixtures bonded together with a fluid cement (cement paste) that hardens (cures) over time. Cement normally comprises from 10 to 15 percent of the concrete mix, by weight. Through a process called hydration reaction, the cement and water react, harden, and bind the aggregates into a rock-like mass. This setting and hardening process continues from when cement is mixed with water and may continue for several months, meaning concrete gets harder over time. Portland cement is not a brand name, but the generic term for the type of cement used in virtually all concrete, just as stainless is a type of steel and sterling a type of silver. Therefore, there is no such thing as a cement sidewalk, or a cement mixer; the proper terms are concrete sidewalk and concrete mixer.

Cement paste is produced by a rapid process of hydration of clinker minerals, releasing large amounts of heat once the cement is mixed with water over a period of minutes, hours and days. Tricalcium silicate ($C_3S$) is one of the main cementitious components of Portland cement, and its hydration reaction is represented by the following chemical equation:

$$2Ca_3SiO_5 + 6H_2O \rightarrow Ca_3Si_2O_7 \cdot 3H_2O + 3Ca(OH)_2 2C_3S + 6H \rightarrow C_3S_2H_3 + 3CH \text{ (in cement nomenclature)}$$

The products formed by the slow hydration reaction over several weeks are calcium silicate hydrate, known as C—S—H, and calcium hydroxide. Dicalcium silicate ($C_2S$) hydrates much more slowly than $C_3S$ does, to form similar type of C—S—H and $Ca(OH)_2$:

$$2Ca_2SiO_4 + 4H_2O \rightarrow Ca_3Si_2O_7 \cdot 3H_2O + Ca(OH)_2 2C_2S + 4H \rightarrow C_3S_2H_3 + CH \text{(in cement nomenclature)}$$

Tricalcium aluminate ($C_3A$) hydrates very quickly, within minutes to hours, generating large amounts of heat, to form $C_2AH_8$ and $C_4AH_{13}$, which then convert with time to stable $C_3AH_6$:

$$2Ca_3Al_2O_6 + 21H_2O \rightarrow Ca_2[Al(OH)_5]_2 \cdot 3H_2O + 2[Ca_2Al(OH)_7 \cdot 3H_2O] \rightarrow 2\{Ca_3[Al(OH)_6]_2\} + 9H_2O(3)$$
$$2C_3A + 21H \rightarrow C_2AH_8 + C_4AH_{13} \rightarrow 2C_3AH_6 + 9H$$
(in cement nomenclature)

A rapid reaction immediately follows between the calcium sulphate in solution and the calcium aluminate hydrate, lasting from several minutes to hours, releasing large amounts of heat and forming ettringite:

$$2[Ca_2Al(OH)_7 \cdot 3H_2O] + 3CaSO4 \cdot 2H_2O + 14H_2O \rightarrow Ca_6[Al(OH)_6]2(SO_4)_3 \cdot 26H_2P + Ca(OH)_2(4)C_4AH_{13} + 3CSH_2 + 14H \rightarrow C_3A \cdot 3CS \cdot H32 + CH$$

Another, fourth, component of cement is calcium aluminoferrite ($C_4AF$), and its hydration is very similar to that of $C_3A$. Mortar is prepared by adding sand to the cement and water mix, according to known preparation methods. Concrete is prepared by adding sand and aggregates (gravel) to the cement mix with water as well as different chemical additives and different chemical admixtures according to the desired properties. The last two ingredients, $C_3A$ and $C_4AF$ undergo an immediate reaction in the first minutes after adding the water together with the plaster. This reaction significantly affects the properties and survivability of the chemical additives.

Cement clinker is a solid material produced to production Portland cement as an intermediary product. Clinker occurs as lumps or nodules, usually 3 to 25 millimetres in diameter. It is produced by sintering (fusing together without melting to the point of liquefaction) limestone and aluminosilicate materials such as clay during the cement kiln stage.

At the macroscopic level, concrete may be a two-phase material, consisting of aggregate particles dispersed in a matrix of the cement paste. At the microscopic level, apart from the aggregate phase and the Hydrated Cement Paste (HCP) phase, a third phase known as the interfacial transition zone (ITZ) comes into the picture. In the past few decades, concrete research has been focused on the microscopic level, i.e., the internal microstructure of cement-based materials. The microstructure consists of hardened cement-based materials with a residual pore system and generally governs the strength and durability of cement-based materials. The pore system consists of porosity and pore sizes. The pore size characteristics of the porous material are generally represented by pore size distribution either in the form of cumulative pore size distribution or differential pore size distribution. There are many methods to measure the porosity and pore size distribution, such as fluid displacement method, helium pycnometer, capillary condensation and adsorption-desorption isotherm, small angle x-ray scattering (SAXS) method, scanning electron microscope (SEM), nuclear magnetic resonance (NMR), AC impedance spectroscopy, mercury intrusion porosimeter (MIP) and backscattered electron images (BSE).

Pores of all types and shapes (gel pores, capillary pores, compaction pores and pores in the interfacial transition zone) and the pore volume affect shear rates of concrete mix, control the strength and physical properties of concrete, and affect workability and consistency, while durability performances are mainly controlled by the interconnected pores. Larger pores are known to have a dominant effect on the strength and durability compared to gel pores, which are known to affect shrinkage and creep. Thus, knowledge of porosity and pore size distribution can be used to obtain information on the performance of concrete. However, porosity and pore size distribution are governed by factors like water/cement ratio, age and size of cement or cementation particles.

Other parameters, besides porosity, that affects the workability and consistency of the concrete mixtures and, therefore, should be continuously monitored during the production of the fresh concrete or batched concrete mix are: the flow of the concrete in the mixer to indicate its workability level and quality, concrete segregation and bleeding, homogeneity or roughness of concrete, continuity and fluidity of the concrete and its colour, air contact of the concrete in the mixer, degree of hydration of the concrete and rate of heat of hydration of cement in the concrete.

Nowadays, the fresh concrete and batched concrete mix are ready produced in stationary concrete systems having a certain slump or flow level (workability) and consistency and then transported to construction sites. During the transportation of the concrete by a concrete mixer truck and while waiting or discharging (offloading) the concrete or upon production of low-quality concrete, different chemical and physical processes occur, such as the slump levels and consistency of the concrete are reduced because of several reasons, for example the surroundings temperature and humidity variations, hydration of the cement, different reactions and at different rates of the different cement components, variable and unwanted effects of the chemical admixtures on the properties of the concrete and on the other hand negative effects of the environment and the various concrete components on the admixtures and their effectiveness throughout the transport time, water absorption and increased moisture of aggregates, the presence of various contaminants such as clays and dust, changes in the properties and qualities of the raw materials (mostly natural materials or byproducts of various industries such as coal ash and slag), operator mistakes, etc. These undesired processes change the properties, performances and consequently hardness and other important properties of the fresh over the transported and offloading and the harden concrete and batched concrete mixes. Therefore, it is necessary to constantly add water by truck drivers at construction sites, use chemical admixtures and high dosages of retarders, water reduction admixtures, and add additional cement as a safety factor and danger in the production of damaged concrete of insufficient quality and a production of unstable concrete mixes.

The use of low-quality concrete mixes, which are different than ordered or desired, and do not meet the required specifications, in the construction sites, and the uncontrolled addition of water into the concrete mixes damages the fresh and harden concrete performance. In general. The quality control of concrete involves ensuring that the concrete mix meets the required specifications, and that the finished product has the desired properties, such as strength, durability, workability, and appearance. This is achieved through testing and monitoring at various stages of production and construction. Quality of the concrete plays an important role in the construction of any building or structure. The strength parameters such as durability, load bearing strength and resistance to environmental factors such as wind, snow and water depends on the quality of concrete. Generally, the quality of concrete must be checked in the different stages of the concreting production process.

Volumetric concrete production trucks were introduced to partially address the above issues. They have numerous capabilities and advantages compared with ready-mix concrete trucks. A ready-mix truck refers to a truck which has a large mixing drum on its back that has material poured in at a batch system, delivers to the site, mixes while it is driving, and pours the concrete produced in the stationary system upon arrival at the site In contrast, allows continued production during the transport of the concrete to the construction site according to exact times, environmental conditions, changes in the quality and properties of the raw materials of the concrete, chemical reactions and chemical and physical changes that occur during the transport time and at a construction site. It is distinctly different in that it has several compartments for various chemical admixtures and water. The truck, after being calibrated, can produce and pour any type of concrete mixture, flow fill, strength level, setting times or other merely by using its on-board computer to put in how much of each ingredient needed to produce the concrete with the desired properties, stability and the required good quality despite all the changes that occur during the transport of the concrete to the construction site.

Thus, the volumetric concrete production trucks are usually capable of delivering the fresh concrete to the construction sites. This delivered fresh concrete will not be "hot" or ready to set up because it has been in a drum for an hour or so and the properties of the concrete change continuously during the transportation of the concrete. As mentioned above, water must be added to concrete that is "hot" to activate cement via the aforementioned chemical reactions and when water is added, the concrete weakens, and the properties of the concrete change in an uncontrolled and desired way.

However, the concrete transported in volumetric concrete production trucks still arrives too wet or, on the contrary too dry. The concrete has an excess or less of water, the batch system messed up, perhaps there was more or less water in the material than the batch master realised, or the delivered concrete has different physicochemical properties than those required at the construction site due to variations in the surrounding conditions during the transportation, changes in the chemical and physical properties of the concrete components, chemical reactions that occur during the transport of the concrete, etc. There is no choice but to use the delivered concrete at the construction site that way or to add water directly at the construction site to adjust the slump level or having no choice but to provide concrete of poor quality and not in the desired and required properties and performance.

The present invention solves the above problems by:
1) continuous production of the fresh concrete and batched concrete mixes using different chemical admixture on a mobile platform during transportation and at the construction site and not in stationary concrete systems,
2) continuous monitoring and quality control of the produced fresh concrete or batched concrete mixes on the mobile platform; and
3) use of multiple sensors and artificial intelligence to control and automatically adjust the production process of the concrete in order to continuously produce the concrete having the stable desired physicochemical properties.

SUMMARY

In one aspect of the present invention, a mobile, volumetric, concrete-production system for continuous production of a fresh concrete or a batched concrete mix, said system comprising:
(1) A mobile platform operated by a driver, an external operator, or an autonomous operating system for transporting components of the system;
(2) A concrete mixer tank installed on said mobile platform for continuous mixing of said fresh concrete or said batched concrete mix contained inside the tank;
(3) Separate compartments installed on said mobile platform for containing water and one or more chemical admixtures used for the production of the concrete;

(4) Dispensers, flow meters, and nozzles for controlled and continuous measuring, dosing, and dispensing of said one or more chemical additives; and (5) An on-board continuous-monitoring and quality-control system;

wherein said continuous-monitoring and quality-control system comprises:

A. An imaging and sensor sub-system comprising:

(a) At least one camera installed inside the concrete mixer tank for continuously gathering visual information, thermal information, and thermal profile of said fresh concrete or said batched concrete mix at anytime before transportation, during transportation, prior to discharge and during the discharge of the concrete through a mixer trough at a construction site;

(b) An acoustic sensor installed on the mixer tank for continuously examining changes in a sound level (dB), frequency (Hz) and duration, and a sound of low and full load of the concrete inside the concrete mixer, said acoustic sensor is thus configured to monitor the workability, cohesion, homogeneity, segregation, and water separation of the concrete;

(c) A hydraulic pressure gauge for indicating a hydraulic pressure of the concrete inside the concrete mixer tank and a hydraulic load intensity on the mixer motor during loading and prior to discharge of the concrete while mixing at a high rotation frequency of the mixer tank from about 5 rpm to about 95 rpm, and during transportation while mixing at a low rotation frequency from about 1 rpm to about 4 rpm, said hydraulic pressure and hydraulic load intensity are indicators of the workability of the prepared concrete, and said hydraulic pressure gauge is thus configured to provide an indication to simulate the workability of the concrete;

(d) At least one temperature gauge for continuously monitoring and controlling the concrete temperature and surrounding temperature outside the mixed concrete, said at least one temperature gauge is thus configured to monitor a hydration progress, including the degree of hydration, rate of heat of hydration and slump or flow reduction of the concrete, and water absorption by aggregates of the concrete; and B. A timeline operation sub-system comprising a computing unit configured to:

(1) Receive an input data of concrete from a concrete plant loading the aggregates and water into the concrete mixer tank, or from the driver, external operator, or autonomous operating system;

(2) Continuously receive and process data from the imaging and sensor sub-system;

(3) Generate an output data on:

quality, consistency, workability, and stability of the concrete being produced in the mixer tank during the transportation and prior to the discharge;

a computed volume of the concrete in the concrete mixer tank computed from an estimated volume discharged by a number of discharge rounds of the tank and by a number of empty blade spiral revolutions;

a concrete temperature and surrounding temperature;

sound changes that indicate drying and homogeneity of the concrete; and deviations from physicochemical parameters of the concrete production process; and (4) Build a course of actions for the driver, external operator or autonomous operating system in a form of computer commands to add said particular one or more chemical admixtures to the concrete mixer tank and optionally water, in specific amounts and at particular intervals of time as computed and indicated by the computing unit, in order to maintain or adjust the desired physicochemical parameters of the concrete production process, and quality, consistency, and stability of the produced concrete, and further perform a re-inspection In one embodiment, the mobile platform for transporting components of the mobile, volumetric, concrete-production system of the present invention is installed on a truck suitable for transporting said fresh concrete or said batched concrete mix inside the mixer tank to a construction site and automatically discharging the concrete at the construction site.

In another embodiment, the chemical admixtures are selected from the group consisting of:

(a) A chemical dispersant suitable for dispersing a concrete mixture and increasing the slump or flow level of concrete and thereby maintaining the desired slump levels of said physicochemical parameters of the concrete;

(b) A cement accelerator suitable for minimising a setting time and consequently, a cure time of the concrete, accelerating hydration of the cement binding with water, adjusting a rate and a degree of the binding reaction of the cement and the chemical additives upon mixing with water, and also preventing freezing of water in the concrete in cold areas;

(c) A viscosifier suitable for increasing viscosity of the fresh concrete or the batched concrete mix, thereby causing a reduction in water excretion (bleeding) and segregation, and increasing homogeneity of the concrete;

(d) An air entrainer surfactant for air entrapment, suitable for increasing the air content in the concrete and adjusting viscosity of the concrete; and (e) A hydration stabiliser formulated to retard the concrete production over extended periods of time.

In major embodiments, at least one camera of the imaging and sensor sub-system of the present invention is selected from: an imaging camera for taking images, a video camera for taking videos, and a thermal imaging camera for generating thermograms and thermal profile, the images and videos is said visual information, and the thermograms is said thermal information. A non-limiting example of the thermal imaging camera is a forward looking infrared (FLIR) camera.

In further embodiments, the input data of concrete are selected from one or more parameters:

a type of concrete, an amount of the water added before the transportation, during the transportation, prior to the discharge and during the discharge of the concrete, an amount of the cement added, a maximum water-to-cement ratio allowed according to the type of the concrete, types and technical characteristics of the chemical admixtures, a grading of the aggregates and their mix, loading times of the materials used for the production of the concrete before the transportation, during the transportation, prior to the discharge and during the discharge of the concrete, a required workability (slump level) of the produced concrete, a required air percentage content data, and an intended concrete application means.

In yet further embodiments, the physicochemical parameters of the concrete production process are selected from the group consisting of:

a slump or flow level (workability) reduction of the concrete computed from a slump simulation and continuous changes in the slump level with time;

an amount and type of said one or more chemical admixture to be added to the concrete in the mixer tank in accordance with required specifications of the prepared and mixed concrete and the properties of aggregates and cement used for the production of the concrete, in order to maintain or adjust a specified workability of the concrete to a required level without addition of water;

a bonding time with cement;

an initial and final setting times of the concrete;

a rate profile (delay or acceleration) for addition of an admixture in order to maintain or adjust to a required level of the desired concrete strength;

an air content of the concrete in the mixer tank;

a degree of hydration of the concrete to a predetermined level computed from the visual information, thermal information, and thermal profile of said concrete and computed as a fraction of cement that has fully reacted with water during the binding process;

a fineness of the produced cement upon mixing with water affecting a rate of a heat evolution of the cement in the concrete and viscosity of the concrete, said heat evolution is proportional to a change in the concrete viscosity during the concrete production process, and said parameters are used to compute a dosage amount, a number of dosages, a time interval between the dosages and a rate of addition of a hydration stabiliser into the mixer tank; and a homogeneity and consistency of the concrete including presence of the aggregates in the concrete, density and concrete colour, height, size, shape, and colour of the aggregates inside the concrete, water bleeding, and segregation of the concrete.

In other embodiments, the physicochemical parameters of the concrete production process are correlated:

with an amount of water to add to the concrete in the concrete mixer tank in order to reach a required water-to-cement ratio and not to exceed this ratio; and with an amount of the chemical admixtures to add to the produced concrete at predetermined dosages and intervals of time, to disperse said concrete and thereby, increase the slump level of the concrete to the desired slump level, without adding water or to control the setting times, air content and homogeneity of the concrete.

In some embodiments, the on-board continuous-monitoring and quality-control system is designed to be operated manually or remotely by the driver or the operator. In other embodiments, the on-board continuous-monitoring and quality-control system is designed to be operated by the autonomous operating system with an embedded artificial intelligence based on machine-learning models, without an external control or intervention from the driver or the operator.

In still other embodiments, applying the machine-learning model on the input data in the computing unit, the output is a single bit whose value is '0' or '1', or an array of bits, or an array of integers, or an array of complex numbers, wherein said single bit, or said array of bits, or said array of integers, or said array of complex numbers corresponds to one or more of the parameters of said generated output data, thereby providing a course of actions for the driver, the external operator or the autonomous operating system to maintain the desired physicochemical parameters of the concrete production process, and quality, consistency, and stability of the produced concrete. Non-limiting examples of the algorithms included in the machine-learning models are a support vector machine (SVM) based process, a decision tree-based process, and a deep neural network (NN) process, wherein the deep neural network is one or more models of a convolutional neural network (CNN), a regional CNN (RCNN), and a long-short term memory recurrent CNN (LSTM Recurrent CNN).

In most of the embodiments, the artificial intelligence involves a training process that includes training the machine-learning model with the aforementioned input data sets of the present invention, wherein each data set is based on a single time stamp and represents the predictions that will be made by the trained machine-learning model. This training of the machine-learning model correlates the input data with pre-determined labels, including the quality, consistency, and stability of the concrete being produced in the mixer tank during the transportation and prior to the discharge; decrease in quality of the aggregates and change in composition of the produced concrete; a volume of the concrete in the concrete mixer tank; a concrete temperature; sound changes that indicate drying of the concrete; and deviations from physicochemical parameters of the concrete production process. The machine-learning model, after being trained, predicts a set of actions, including adding said one or more chemical admixtures in specific amounts and at particular intervals of time into the mixer tank.

In a particular embodiment, the imaging and sensor sub-system further comprises an imaging or video camera installed on the mobile platform outside the concrete mixer tank, for monitoring events and activities outside the mixer truck. Non-limiting examples of such events and activities outside the mixer truck are activities of factory and construction personnel, factory and laboratory workers and engineers taking samples of the discharged concrete for determining quality of the concrete, and an operator and driver of the mobile platform.

In a certain embodiment, the imaging and sensor sub-system further comprises a tachometer or a revolutions-per-minute (RPM) gauge installed on the truck for indicating a centrifugal force or rotation speed and tracking progress of the concrete mixer tank of the truck, and additional simulation of the slump level.

In some embodiments, the computing unit of the timeline operation sub-system of the present invention further comprises a communication module installed into or connected to the computing unit and configured to:

continuously receive and process data in a form of thermograms, images, video and audible or acoustic signals, temperature and temperature gradient, and hydraulic pressure, from said imaging and sensor sub-system, and simultaneously transmit readable information to an external storage device or user's interface in a form of text, graphics, or audible signals, and updating or alerting the user if any action on the user's side is required.

In another aspect of the present invention, a method for continuous monitoring and quality control of a production of a fresh concrete or a batched concrete mix in a concrete mixer tank comprises:

(a) Continuously gathering visual information, thermal information, and thermal profile of said fresh concrete or said batched concrete mix at any time before transportation, during the transportation, prior to discharge and during the discharge of the concrete through a mixer trough at a construction site with at least one camera selected from an imaging camera for taking images, a video camera for taking videos, and a thermal imaging camera for generating thermograms and thermal profile;

(b) Continuously examining changes in a sound level (dB), frequency (Hz) and duration, and a sound of low and full load of the concrete inside the concrete mixer with an acoustic sensor installed on the mixer tank and estimating a slump level (workability) of the concrete and monitor cohesion, homogeneity, segregation, and water separation of the concrete;

(c) Continuously indicating a hydraulic pressure of the concrete inside the concrete mixer tank and a hydraulic load intensity on the mixer motor with a hydraulic pressure gauge installed on the mixer tank, during loading and prior to discharge of the concrete, while mixing at a high rotation frequency of the tank from about 5 rpm to about 95 rpm, and during transportation while mixing at a low rotation frequency from about 1 rpm to about 4 rpm, thereby indicating and simulating the workability of the concrete;

(d) Continuously monitoring and controlling the concrete temperature and surrounding temperature outside the mixed concrete with a temperature gauge, thereby monitoring a hydration progress, including the degree of hydration, rate of heat of hydration and slump reduction of the concrete, and water absorption by aggregates of the concrete;

(e) Continuously indicating a centrifugal force or rotation speed and tracking progress of the concrete mixer tank with a tachometer or a revolutions-per-minute (RPM) gauge installed on the tank, thereby providing computation of a volume of the concrete in the concrete mixer tank and additionally simulating the slump level;

(f) Receiving an input data of the concrete loaded and mixed in the mixer tank from a human operator or user, or from an autonomous operating system on a computing unit;

(g) Continuously receive and processing data from Steps (a) to (d) on the computing unit;

(h) Generating an output data on:

quality, consistency, workability, and stability of the concrete being produced in the mixer tank during the transportation and prior to the discharge;

decrease in quality of the aggregates and change in composition of the produced concrete;

a computed volume of the concrete in the concrete mixer tank computed from an estimated volume discharged by a number of discharge rounds of the tank and by a number of empty blade spiral revolutions;

a concrete temperature and the surrounding temperature;

sound changes that indicate the homogeneity and slump or flow level of the concrete; and deviations from physicochemical parameters of the concrete production process; and (i) Building a course of actions for the human operator or user, or the autonomous operating system in a form of computer commands, in order to maintain desired physicochemical parameters of the concrete production process, and quality, consistency, and stability of the produced concrete.

Various embodiments may allow various benefits and may be used in conjunction with various applications. The details of one or more embodiments are set forth in the accompanying figures and the description below. Other features, objects and advantages of the described techniques will be apparent from the description and drawings and from the claims.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Disclosed embodiments will be understood and appreciated more fully from the following detailed description taken in conjunction with the appended figures. The drawings included and described herein are schematic and are not limiting the scope of the disclosure. It is also noted that in the drawings, the size of some elements may be exaggerated and, therefore, not drawn to scale for illustrative purposes. The dimensions and the relative dimensions do not necessarily correspond to actual reductions to the practice of the disclosure.

FIG. 4 shows an image of concrete provided with a suitable slump after water was added to the concrete directly at the construction site.

FIG. 5 shows, on the left, three types of different concrete mixed in a concrete mixer, and, on the right, three corresponding images of the slump level of the concrete as tested.

FIG. 6 shows concrete that has not been mixed enough and therefore lumps can be seen in the concrete.

FIGS. 11a, 11c, 11e, 11g, 11i, 11k, 11m and 11 show the images of the ready-mix concrete or precast concrete having different grades, which indicate different physical properties (consistency, segregation, and homogeneity) and different workability (slump or flow level) of the concrete.

FIGS. 11*b*, 11*d*, 11*f*, 11*h*, 11*j*, 111, 11*n* and 11*p* show the corresponding images processed in the computing unit for each and every grade using the filter that identifies the shade contours of the images using the image pixels hue levels. That gives an indication of the levels of consistency and homogeneity (fluidity) and slump of the concrete by correlating these measured levels to the level of consistency, homogeneity and slump determined by the relevant standard.

DETAILED DESCRIPTION

Figure 1:
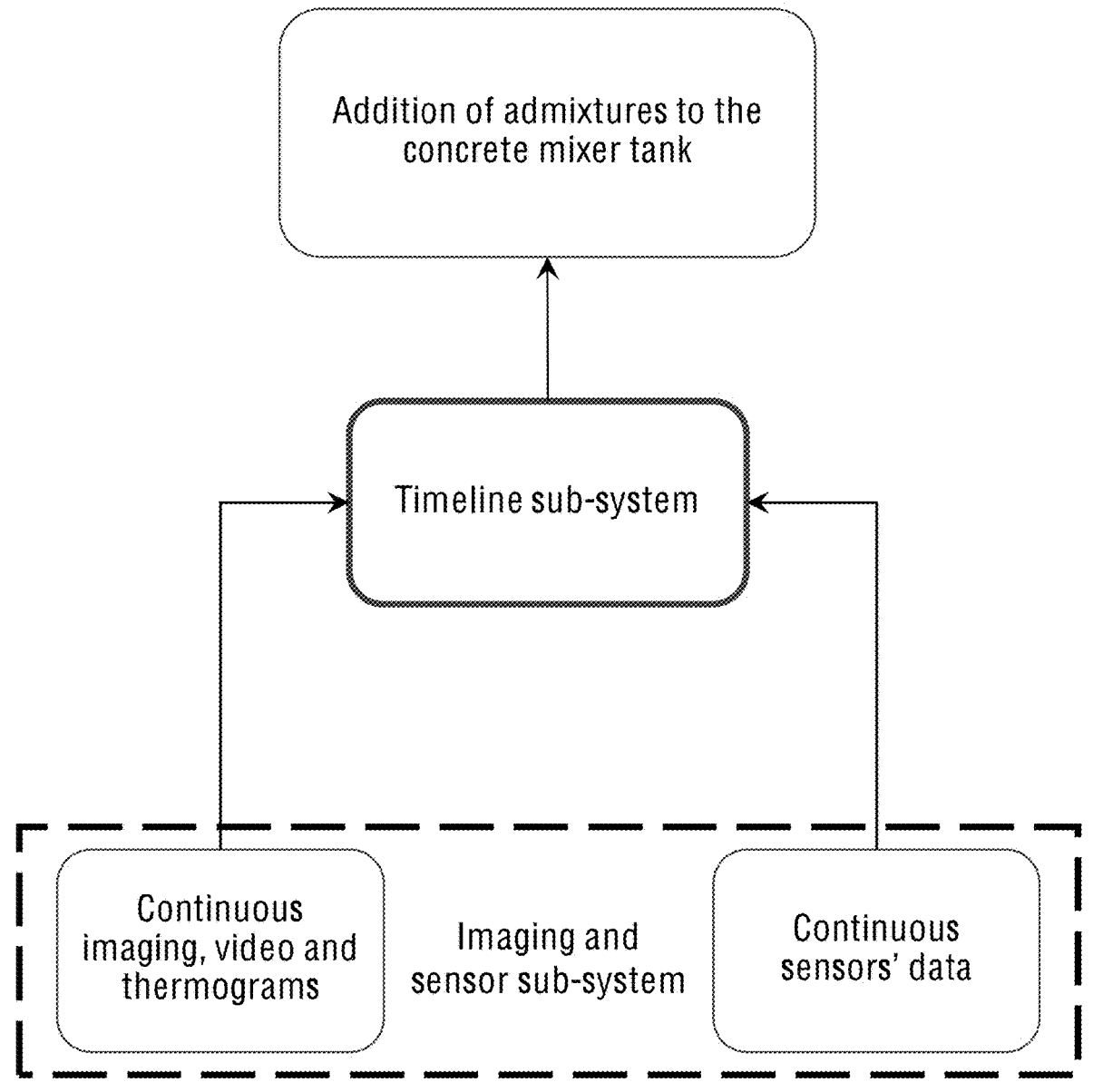
FIG. 1 schematically shows the system of the present invention and the result of its operation, which is building a set of instructions on adding certain different chemical admixtures at specific amounts and at particular intervals of time into the mixer tank for the driver, the external operator, or the autonomous operating system.

In the following description, various aspects of the present application will be described. For purposes of explanation, specific details are set forth to provide a thorough understanding of the present application. However, it will also be apparent to one skilled in the art that the present application may be practiced without the specific details presented herein. Furthermore, well-known features may be omitted or simplified in order not to obscure the present application.

The term "comprising", used in the claims, is "open ended" and means the elements recited, or their equivalent in structure or function, plus any other element or elements which are not recited. It should not be interpreted as being restricted to the means listed thereafter; it does not exclude other elements or steps. It needs to be interpreted as specifying the presence of the stated features, integers, steps, or components as referred to, but does not preclude the presence or addition of one or more other features, integers, steps or components, or groups thereof. Thus, the scope of the expression "a composition comprising x and z" should not be limited to compositions consisting only of components x and z. Also, the scope of the expression "a method comprising the steps x and z" should not be limited to methods consisting only of these steps.

Unless specifically stated, as used herein, the term "about" is understood as within a range of normal tolerance in the art, for example, within two standard deviations of the mean. In one embodiment, the term "about" means within 10% of the reported numerical value of the number with which it is being used, preferably within 5% of the reported numerical value. For example, the term "about" can be immediately understood as within 10%, 9%, 8%, 7%, 6%, 5%, 4%, 3%, 2%, 1%, 0.5%, 0.1%, 0.05%, or 0.01% of the stated value. In other embodiments, the term "about" can mean a higher tolerance of variation depending on for instance the experimental technique used. Said variations of a specified value are understood by the skilled person and are within the context of the present invention. As an illustration, a numerical range of "about 1 to about 5" should be interpreted to include not only the explicitly recited values of about 1 to about 5, but also include individual values and sub-ranges within the indicated range. Thus, included in this numerical range are individual values such as 2, 3, and 4 and sub-ranges, for example from 1-3, from 2-4, and from 3-5, as well as 1, 2, 3, 4, 5, or 6, individually. This same principle applies to ranges reciting only one numerical value as a minimum or a maximum. Unless otherwise clear from context, all numerical values provided herein are modified by the term "about". Other similar terms, such as "substantially", "generally", "up to" and the like are to be construed as modifying a term or value such that it is not an absolute. Such terms will be defined by the circumstances and the terms that they modify as those terms are understood by those of skilled in the art. This includes, at very least, the degree of expected experimental error, technical error and instrumental error for a given experiment, technique or an instrument used to measure a value.

As used herein, the term "and/or" includes any and all combinations of one or more of the associated listed items. Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

The present invention describes a mobile, volumetric, concrete-production system for continuous production of a fresh concrete or a batched concrete mix, said system comprising:

(1) A mobile platform operated by a driver, an external operator, or an autonomous operating system for transporting components of the system;

(2) A concrete mixer tank installed on said mobile platform for continuous mixing of said fresh concrete or said batched concrete mix contained inside the tank;

(3) Separate compartments installed on said mobile platform for containing water and one or more chemical admixtures used for the production of the concrete;

(4) Dispensers and flow meters for controlled and continuous measuring, dosing, and dispensing of said one or more chemical additives; and (5) An on-board continuous-monitoring and quality-control system;

wherein said continuous-monitoring and quality-control system comprises:

A. An imaging and sensor sub-system comprising:

(a) At least one camera installed inside the concrete mixer tank for continuously gathering visual information, thermal information, and thermal profile of said fresh concrete or said batched concrete mix at any time before transportation, during transportation, prior to discharge and during the discharge of the concrete through a mixer trough at a construction site;

(b) An acoustic sensor installed on the mixer tank for continuously examining changes in a sound level (dB), frequency (Hz) and duration, and a sound of low and full load of the concrete inside the concrete mixer, said acoustic sensor is thus configured to monitor the workability of the concrete and monitor cohesion, homogeneity, segregation, and water separation of the concrete;

(c) A hydraulic pressure gauge for indicating a hydraulic pressure of the concrete inside the concrete mixer tank and a hydraulic load intensity on the mixer motor during loading and prior to discharge of the concrete while mixing at a high rotation frequency of the mixer tank from about 5 rpm to about 95 rpm, and during transportation while mixing at a low rotation frequency from about 4 rpm to about 12 rpm, said hydraulic pressure and hydraulic load intensity are indicators of the workability of the prepared concrete, and said hydraulic pressure gauge is thus configured to provide an indication to simulate the workability of the concrete; and (d) At least one temperature gauge for continuously monitoring and controlling the concrete temperature and surrounding temperature outside the mixed concrete, said at least one temperature gauge is thus configured to monitor a hydration progress, including the degree of hydration, rate of heat of hydration and slump or flow reduction of the concrete, and water absorption by aggregates of the concrete; and B. A timeline operation sub-system comprising a computing unit configured to:

(1) Receive an input data of concrete from the driver, the external operator, or the autonomous operating system, or a concrete plant loading the aggregates and water into the concrete mixer tank;

(2) Continuously receive and process data from the imaging and sensor sub-system;

(3) Generate an output data on:

quality, consistency, workability, and stability of the concrete being produced in the mixer tank during the transportation and prior to the discharge;

a computed volume of the concrete in the concrete mixer tank computed from an estimated volume discharged by a number of discharge rounds of the tank and by a number of empty blade spiral revolutions;

a concrete temperature and the surrounding temperature;

sound changes that indicate the homogeneity and slump or flow level of the concrete; and deviations from physicochemical parameters of the concrete production process; and (4) Build a course of actions for the driver, external operator or autonomous operating system in a form of computer commands to add water, a chemical dispersant and said one or more of the different chemical admixtures to the concrete mixer tank, in specific amounts and at particular intervals of time as computed and indicated by the computing unit, in order to maintain or adjust the desired physicochemical parameters of the concrete production process, and quality, consistency, and stability of the produced concrete, and further perform a re-inspection.

Thus, the mobile, volumetric, concrete-production system of the present invention for continuous production of a fresh concrete or a batched concrete mix combines the mobile platform with a concrete mixer tank and several containers containing various chemical admixtures with their scaling and dosing system.

In one embodiment, a concrete monitoring and quality control system is installed on the mobile platform and comprises a thermal image camera, several sensors selected from a hydraulic pressure gauge, an acoustic sensor and a temperature gauge, and a communication system. Continued and ongoing production and quality control is carried out by the production system operator or mobile platform driver, or an operator at the remote, stationary system or autonomous operating system, and either supervised by the system engineer or performed automatically as determined by a concrete plant loading the aggregates and optionally water into the concrete mixer tank.

After preloading aggregates in the concrete plant, including sand, gravel, and crushed stone rock, chemical additives, for example fly ash or slag, water, a chemical clinker (including gypsum addition) used as a binder (cement) for producing concrete upon mixing with water, and one or more chemical admixtures in the concrete plant or stationary concrete system, plant or excavation site, the required chemical admixtures are fed into the concrete mixer tank during the transportation on the mobile platform.

The chemical admixtures are added to the mixer at a certain rate and dosages depending on the properties of the raw materials in the concrete, the progress of the chemical reaction of the cement with water and chemical and physical changes that occur during the transport of the concrete to and from the construction site. The controlled and continuous addition of the particular types of the chemical admixtures, in specific dosages, and at particular intervals of time is one of the major aspects of the present invention. In fact, such addition of the chemical mixtures in the controlled and continuous manner obviate the use of water in the production of the concrete on the go and make the entire concrete production process during the transportation much more efficient and allows the automation of the production process on the mobile platform.

Furthermore, the mobile platform does not need to transport large volumes of water, in contrast to a conventional concrete mixing truck. Carefully controlled and continuous addition of the chemical admixtures without water makes it possible to prepare the fresh concrete or batched concrete mix and maintain the required and desired physicochemical properties of the concrete, its stability, quality, and homogeneity during the transportation and then during the discharge of the prepared concrete at the construction site. In the present invention, only small amounts of water are added from a small water container installed on the mobile platform to wash the residuals of the dispensed dosage of a chemical admixture into the mixing tank, thereby increasing accuracy of the dosing and dispensing of the chemical admixtures.

In one embodiment, this process is controlled and adjusted by either a truck driver or external operator. In other words, the continuous and ongoing production process and quality control are carried out by either a mobile platform driver, or an external production operator remotely, and either supervised by a system engineer or performed automatically as determined by a concrete plant.

In another embodiment, this process is controlled and adjusted by an "autonomous operating system", which is a computer system that enables core capabilities for the autonomous operations for an unmanned mobile platform and continuous-monitoring and quality-control system of the present invention. In one embodiment, the autonomous operating system comprises an embedded artificial intelligence based on machine-learning models, without an external control or intervention from the driver or the operator and in accordance with the properties of the raw materials, such as aggregate water absorption rate, aggregate moisture, quality of the aggregates and sand, presence of impurities, such as dust or clay, in the raw materials, hydration rate, transportation time, hydration progress of the different cement component and fineness of the cement, external temperature and humidity conditions, and the desired physicochemical properties of the obtained concrete.

In a particular embodiment, the entire concrete monitoring and quality control system, including all the processes carried within, is operated by artificial intelligence based on machine learning models developed by the present inventors.

The following physicochemical parameters of the produced concrete and of the concrete production process are continuously monitored by the concrete-monitoring and quality-control system, and adjusted, if needed:

a slump level or flow (workability) reduction of the concrete computed from a slump simulation and continuous changes in the slump level with time;

an amount and type of a chemical admixture to be added to the concrete in the mixer tank in accordance with the desired properties of the prepared and mixed concrete and the properties of aggregates and cement used for the production of the concrete, in order to maintain or adjust to a required level the desired workability, setting times, homogeneity and other performances of the concrete without addition of water;

a bonding time with the cement;

an initial and final setting times of the concrete;

a rate profile (delay or acceleration) for the addition of an admixture in order to maintain or adjust to a required level of the desired concrete strength or desired setting times;

an air content of the concrete in the mixer tank;

a degree of hydration of the concrete to a predetermined level computed from the visual information, thermal information, and thermal profile of said concrete and computed as a fraction of a chemical clinker that has fully reacted with water during the binding process. The degree of hydration is adjusted to the predetermined level by the addition of a hydration stabiliser (retarder) or acceleration agent of the concrete;

a fineness of the produced cement and other concrete components upon mixing with water affecting a rate of heat evolution of the cement in the concrete and viscosity of the concrete, said heat evolution is proportional to a change in the concrete viscosity during the concrete production process, and said parameters are used to compute a dosage amount, a number of dosages, a time interval between the dosages and a rate of addition of a hydration stabiliser and an increased slump admixture into the mixer tank; and a homogeneity and consistency of the concrete including presence of the aggregates in the concrete, density and concrete colour, height, size, shape, and colour of the aggregates inside the concrete, water bleeding, and segregation of the concrete.

In general, the rate of heat of hydration of cement in the concrete indicates the viscosity of the concrete and determines an amount of a hydration stabiliser to be added to the cement in the mixer tank. The hydration stabiliser is one of the chemical admixtures formulated to retard the concrete production over extended periods of time or on the other hand, to add accelerator admixture to decrease the setting time and also to prevent the freeze of water in cold areas to achieve faster setting and increased an initial strength. The heat of hydration of cement is heat evolution, which is proportional to the change in viscosity during the concrete production process.

In certain embodiments of the present invention, the above physicochemical parameters of the produced concrete are correlated with an amount of water to add to the concrete in the concrete mixer tank in order to reach a required water-to-cement ratio and not to exceed this ratio. The physicochemical parameters of the produced concrete are also correlated with an amount and types of the different chemical admixtures to add to the produced concrete at predetermined dosages and intervals of times, to disperse said concrete and thereby increase the slump level of the concrete to the desired slump level, without adding water.

The monitoring and adjusting process is continuous, which means it is automatically carried out by the system until the concrete is discharged (offloaded) or prior to that, if so desired. Reference is now made to FIG. 1 schematically showing the system of the present invention and the result of its operation, which is building a set of instructions on adding certain chemical admixtures at specific amounts and at particular intervals of time into the mixer tank for the driver, the external operator, or the autonomous operating system.

In the present application, the term "volumetric concrete production" means the production of concrete, which is mixed and delivered to the construction site by volume of concrete, rather than weight. Volumetric concrete is produced from various ingredients (water, cement, additives as fly ash, slag, limestone powders etc., sand, and aggregates) autonomously in self-contained portable batch mixers, which produce concrete by proportioning the materials out over time by volume and relating that volume back to the materials specific weight. Volumetric concrete production offers complete control over when, where, how much, and what type of concrete is mixed and applied for any type of project, large or small. That flexibility to adapt to any situation is unmatched by any other approach.

The term "fresh concrete" means that the concrete had been recently mixed from the beginning of loading the concrete in the plant, transporting the concrete, discharging the concrete, and completing the application of the concrete on the concrete element. It has the required homogeneity and consistency, and it possess its original workability at any time and state before transportation, during transportation, prior to discharge and during the discharge of the concrete through a mixer trough at a construction site, so that it can be placed, handled, consolidated, and finished by the intended methods. Concrete is referred to as "fresh" when the setting and hardening process has not yet started. "Fresh concrete" can be deformed and poured which means it can be transported or pumped and used to fill moulds or formwork. It appears in plastic state and can be moulded in any forms, whereas the hardened concrete is the one which is fully cured. For the concrete to be considered "fresh", it should be easily mixed and transported, be uniform throughout a given batch and between batches, and be of a consistency so that it can fill completely the forms for which it was designed.

"Batched concrete mix" means that the concrete was mixed from the required concrete ingredients with either weight or volume according to the mix requirement of a consistent quality of concrete. To produce the batched concrete mix, the ingredients should be loaded into the mixer in a predefined sequence and amount. Two main types of batch mixers can be distinguished by the orientation of the axis of rotation: horizontal or inclined (drum mixers) or vertical (pan mixers). The drum mixers have a drum, with fixed blades, rotating around its axis, while the pan mixers may have either the blades or the pan rotating around the axis. In the present invention, both types of mixers can be used to produce the batched concrete mix.

In general, fresh concrete and batched concrete mix are produced from a combination of aggregates, including sand, gravel, and crushed stone rock of different sizes, water, a chemical clinker (including gypsum addition) used as a binder for producing cement upon mixing with water, chemical additives, for example fly ash, limestone powder or slag, and chemical admixtures. The main properties of concrete are:

1) Mechanical strength, in particular compressive strength. The strength of normal concrete varies between 5 and 100 MPa. The term "high performance concrete" is used above 60 MPa, which corresponds to a force of 60 tonnes acting on a square with sides of ten centimetres. Mechanical strength depends mainly on the amount of water in concrete.

2) Porosity and density. The denser (or the less porous) the concrete the better its performance as compressive strengths and the greater its durability. The density of concrete is increased by optimizing the dimensions and packing of the aggregate and reducing the water content.

3) Homogeneity of a concrete mix, consistency, and fluidity (without lumps, segregation, or water bleeding).

Unless otherwise defined, "homogeneity" of a fresh concrete or a batched concrete mix is a percentage according to the given composition of components. The concrete mix is considered homogeneous if the samples taken from different places in the mixer contain the individual components of the mixture in equal percentages. The concrete mix homogeneity is associated with the strength of concrete and assessed by engineers using visual inspection and experience. "Concrete consistency" in the present invention refers to the relative mobility or ability of freshly mixed concrete to flow. It includes the entire range of fluidity from the driest to the wettest possible mixtures. Plastic consistency indicates a condition where applied stress will result in continuous deformation without rupture. "Slump", "slump level", "flow" or "flow level" is the measure of concrete homogeneity, consistency, and fluidity during the condition of the fresh concrete. It shows the flow and overall workability of freshly mixed concrete.

"Concrete workability" is a term that refers to how easily freshly mixed concrete can be placed, consolidated, and finished to a homogeneous condition with minimal loss of homogeneity. In general, the workability of concrete is determined by how fluid the concrete mix is (i.e., as the cement-to-water ratio), which is essentially the slump of concrete. It is synonymous with placing ability and involves not only the concept of a consistency of concrete, but also the condition under which it is to be placed, i.e., size and shape of the member, spacing of reinforcing, or other details interfering with the ready filling of the forms.

The more fluid the concrete, the higher the slump, and whilst the slump is seen as a measure of water content, it is typically also used as a measure of concrete consistency. Simply put, the higher the slump, the wetter the mix. Five-inch slump is very common with normal weight concrete and is a good for pumping. Slumps that are above average will cause reduced strength, durability, and permeability of the concrete, if more water is added to increase the slump level.

There are three primary factors that affect the workability of concrete:

1) The ratio of water to cement. The higher proportion of cement (or lower water-to-cement ratio) typically means a stronger concrete mix. With the right amount of cement paste, the coating of aggregates delivers a better consolidation and finish. If the mix is not hydrated adequately, the mechanical strength will be low. It is also a lot harder to place and finish. However, if too much water is used then this can lead to a negative impact on segregation and final mechanical strength, which is detrimental to the building. Typically, most mixes look to get a ratio of around 0.45 to 0.7 to achieve workable concrete.

2) The size, shape, chemical and physical properties, and quality of aggregates (stones and sand) used in a concrete mix, and contaminates as clay, dust and moisture in the aggregates and sand, affect its workability and the performance of the concrete. As aggregate surface area increases, the more cement paste is needed to cover the entire surface of aggregates and the increased water demand. So, concrete mixes with smaller aggregates will be typically less workable when compared to larger sizes. Crushed aggregates with decent proportions tend to bond best with the cement and deliver decent workability.

3) Chemical admixtures are used in concrete to improve and to adjust the properties of the fresh and harden concrete, things like mechanical strength, setting times and workability and handling of the concrete mix. A few examples include plasticizers to help regulate concrete consistency, air entrainers (which are mostly surface-active substances, such as soaps from natural resins or synthetic non-ionic and ionic tensides with defoaming agents, that are used to entrain microscopic air bubbles into the concrete and protect it from frost) to improve freeze/thaw resistance and internal curing to help reduce damage such as cracks and strength loss.

In particular embodiments, the chemical admixtures used in the present invention are selected from the group consisting of:

chemical dispersants suitable for dispersing a concrete mixture and thereby maintaining the desired levels of the chemical parameters of concrete, surfactant admixtures suitable for altering the physicochemical parameters of the produced concrete as hydration stabilisers (retarders) to slow the hydration rate during the transportation of the concrete in more effective way, cement accelerators suitable for speeding the setting times (initial and final) and thus, cure time of the cement and accelerating the hydration of the cement binding process with water, adjusting the rate and degree of the binding reaction of the cement and water, and binding materials within the concrete. In addition, there are accelerator that are also added to prevent freezing of water inside the concrete mixing tank in cold areas, and thus enable the production of concrete at low temperatures, viscosifiers suitable for increasing viscosity of the fresh concrete or the batched concrete mix, thereby causing a reduction in water excretion and segregation, and increasing homogeneity of the concrete, air entrainer surfactants for air entrapment, suitable for increasing the air content in the fresh concrete and adjusting viscosity of the concrete, and chemical inhibitors.

As used herein, the term "chemical admixture" includes productioned chemical admixtures or adjuvants added during continuous and ongoing concrete mixing to enhance or to adjust the workability (slump) of the fresh concrete or to affect other physicochemical properties of the concrete as mentioned above (setting times, homogeneity). Chemical admixtures are added to concrete batch during mixing concrete according to the progress of the hydration, aggregates water absorption, environmental conditions, and chemical and physical properties of the raw materials in concrete, over the time and transportation of the concrete to the construction sites and at the sites before unloading the concrete. They improve concrete quality, adjust the required workability, manageability, acceleration, or retardation of setting time, among other properties that could be altered to get specific results. Non-limiting examples of the dispersants suitable for use in the present invention are polycarboxylate polymer and naphthalene sulphonate.

In particular regard, a "cement accelerator" is an admixture for the use in concrete, mortar, plasters, or screeds. The addition of an accelerator speeds the setting times (initial and final) and thus, cure time starts earlier. This allows concrete, for example, to be placed in winter with reduced risk of frost damage and in a shorter time. Concrete is damaged if it does not reach to the required setting times or to a strength of 10-25 MPa before freezing. Typical chemicals regularly used for acceleration are calcium nitrate $(Ca(NO_3)_2)$, calcium nitrite $(Ca(NO_2)_2)$, calcium formate $(Ca(HCOO)_2)$ and aluminium compounds. Novel alternatives include cement based upon calcium sulphoaluminate (CSA), which sets within 20 minutes and develops sufficient rapid strength that an airport runway can be repaired in a six-hour window and be able to withstand aircraft use at the end of that time, as well as in tunnels and underground, where water and time limitations require extremely fast strength and setting.

Figure 2:
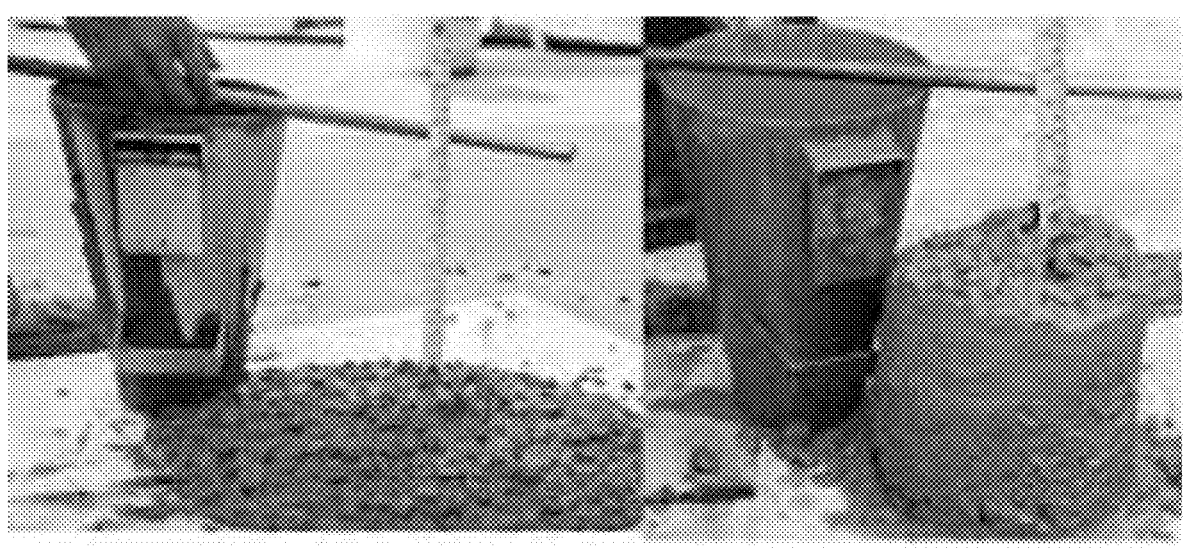
FIG. 2 shows an image of a slump test of concrete.

The slump test is one of the tests used to measure the workability and assess the consistency of fresh concrete. There are other techniques to test workability such as a flow for very high workability concrete, such as self-compacting concrete type (SCC). Generally, it is used to check that the correct volume of water has been added to the mix. Conventionally, workability of concrete is determined by checking the slump level of concrete using a cone as shown in FIG. 2. The slump test of concrete includes the following steps:

(1) The cone is positioned on the base plate with the smaller aperture uppermost.

(2) Freshly supplied concrete is poured into the cone to roughly one third of its depth (100 ml).

(3) The concrete is tamped using 25 strokes of the steel rod.

(4) Further concrete is added to fill the cone to about two thirds depth (another 100 mm of concrete).

(5) The concrete is tamped again using 25 strokes of the rod just penetrating the layer below.

(6) The cone is filled to the top and tamped using a final 25 strokes with the steel rod.

(7) Using the tamping rod slid across top of the cone the surface of the concrete is "struck off" level with the top of the cone.

(8) The cone is carefully lifted upwards, clear of the concrete and placed, upside-down beside the concrete.

(9) After about a minute, the unrestrained concrete will settle downwards or "slump" due to gravity.

(10) The steel rod is used to span the inverted cone and towards the slumped concrete.

(11) The height difference between the steel cone and the slumped concrete is measured. This difference, which is measured to the nearest 10 millimetres, is actually the slump level.

In the present invention, the slump test is carried out directly on board of the mobile platform with the concrete-monitoring and quality-control system as further described. Slump test results can be classified in four types:

1) True slump, which is the only slump that can be measured in the test according to standards. The measurement is taken between the top of the cone and the top of the concrete once the cone has been removed.

2) Zero slump, which is the indication of a very low water to cement ratio that results in "dry" mixes. This type of concrete is largely used for road construction.

3) Collapsed slump, which indicates that the water to cement ratio is too high, for example, the concrete mix is too wet, or it is a high workability mix.

4) Shear slump, which indicates an incomplete result, and the concrete needs to be retested.

Unless otherwise defined, "concrete stability" in the present invention refers to the ability of the produced concrete to remain stable and homogeneous during handling, transportation, and discharge at the constructive sites without excessive segregation. Stability of the concrete is characterised by the bleeding and segregation tendencies of the concrete using a direct method of measurement, for example the method based on floatation over carbon tetrachloride.

Figure 3:
FIG. 3 shows images of the low-slump (dry) concrete discharged at the construction site and having a much lower slump level than required.

Customers and buyers of concrete usually order a certain mechanical strength and slump level of the concrete according to the required specifications of the concrete to ensure its quality. Concrete systems produce concrete and supply it to the customers. The slump level of concrete usually decreases from the moment the concrete is prepared due to the hydration of cement in the concrete with water, water absorption by aggregates, admixtures absorption by aggregates in the concrete, change of ambient temperature, impurities such as clays and organic materials in the aggregates and sand used to make the concrete, reduction performances of the different types of admixtures mixed during the load of the cement water and aggregates in the initial mixing in the concrete system. Therefore, the slump level of concrete indicating its homogeneity, consistency and fluidity decreases with the time of production and transportation of the concrete until the concrete arrives at the construction site and is used. FIG. 3 shows images of the zero-slump (dry) concrete discharged at the construction site and having a much lower slump level than required, and FIG. 4 shows an image of concrete provided with a suitable slump after water was added to the concrete directly at the construction site, which reduced its mechanical strength.

Figure 5:
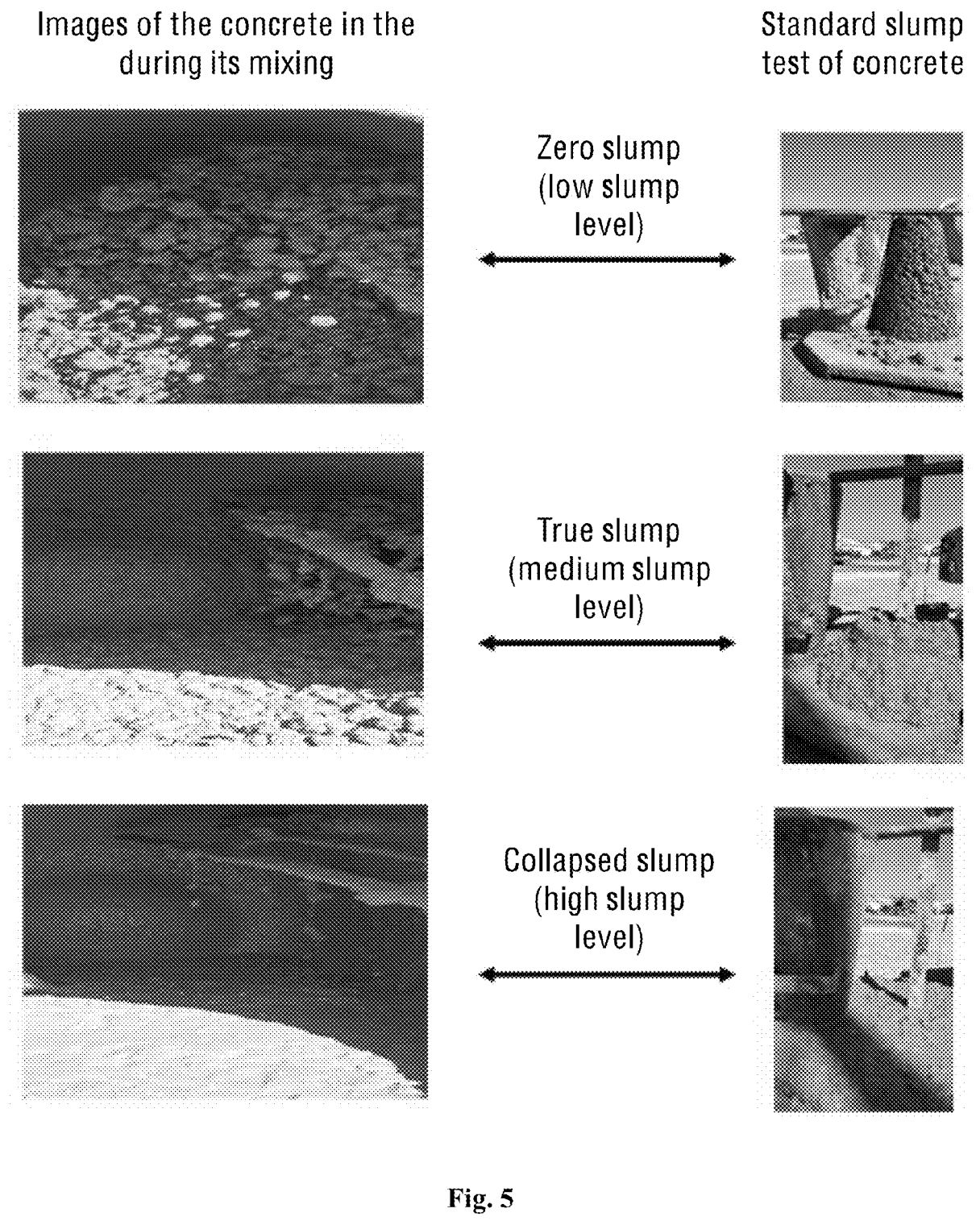

Upon producing the concrete in the mobile volumetric concrete-production system of the present invention with a certain slump level, it is possible, using an imaging and sensor sub-system of the present invention to determine or to simulate the concrete slump and the concrete slump reduction of the produced concrete in the mixer tank right after the mixing of all the concrete components, during the transportation of the concrete, and during the discharge (offload) of the concrete at the construction site. The slump level and other characteristics of the freshly prepared concrete can be assessed by sensors as the image processing and finding a correlation between the image of the concrete fluidity and the slump test performed as mentioned above and further detailed. Reference is now made to FIG. 5 showing on the left, three types of different mixed concrete, and, on the right, three corresponding images of the slump level of the concrete as tested. The difference in the slump level of the concrete can be clearly seen just by looking at these images of the concrete.

Apart from the slump level of concrete, the quality of concrete is affected by a number of factors. FIG. 6 shows concrete that has not been mixed enough and therefore lumps can be seen in the concrete. These lumps will be poured into a building structure and will substantially worsen the properties of the hardened concrete in the structure, which will eventually deteriorate because of these lumps.

Figure 7:
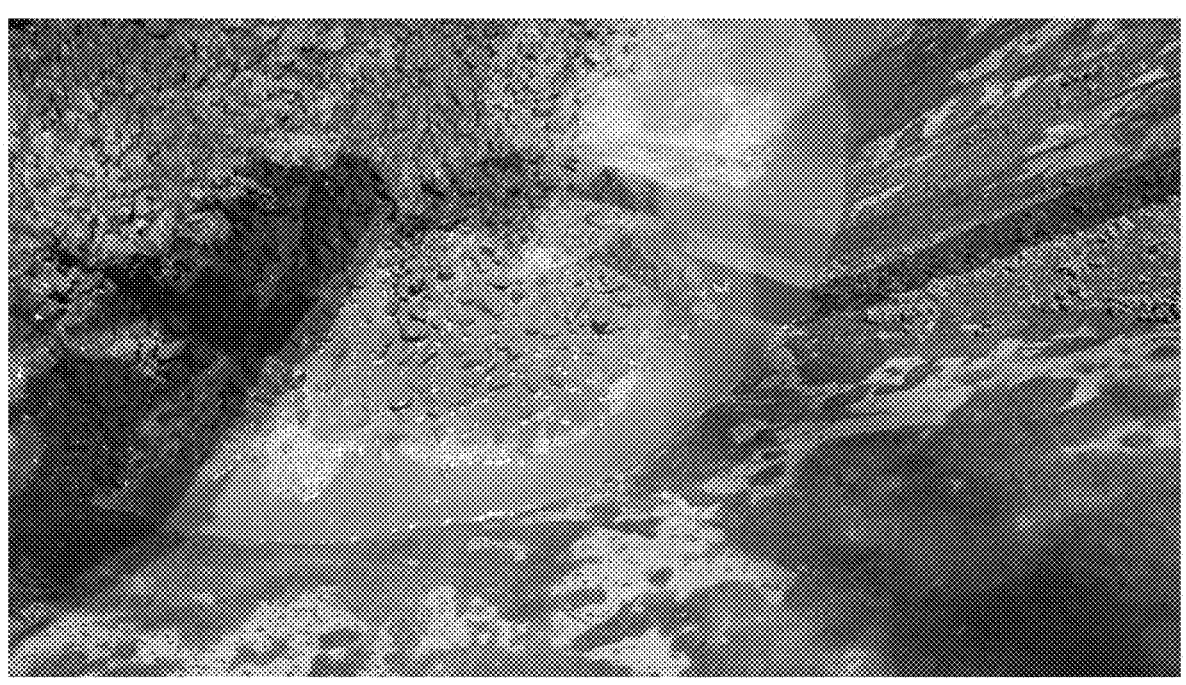
FIG. 7 shows an image of decomposed concrete having a collapsed slump and a lot of water bleeding and concrete segregation.
Figures 8, 9:
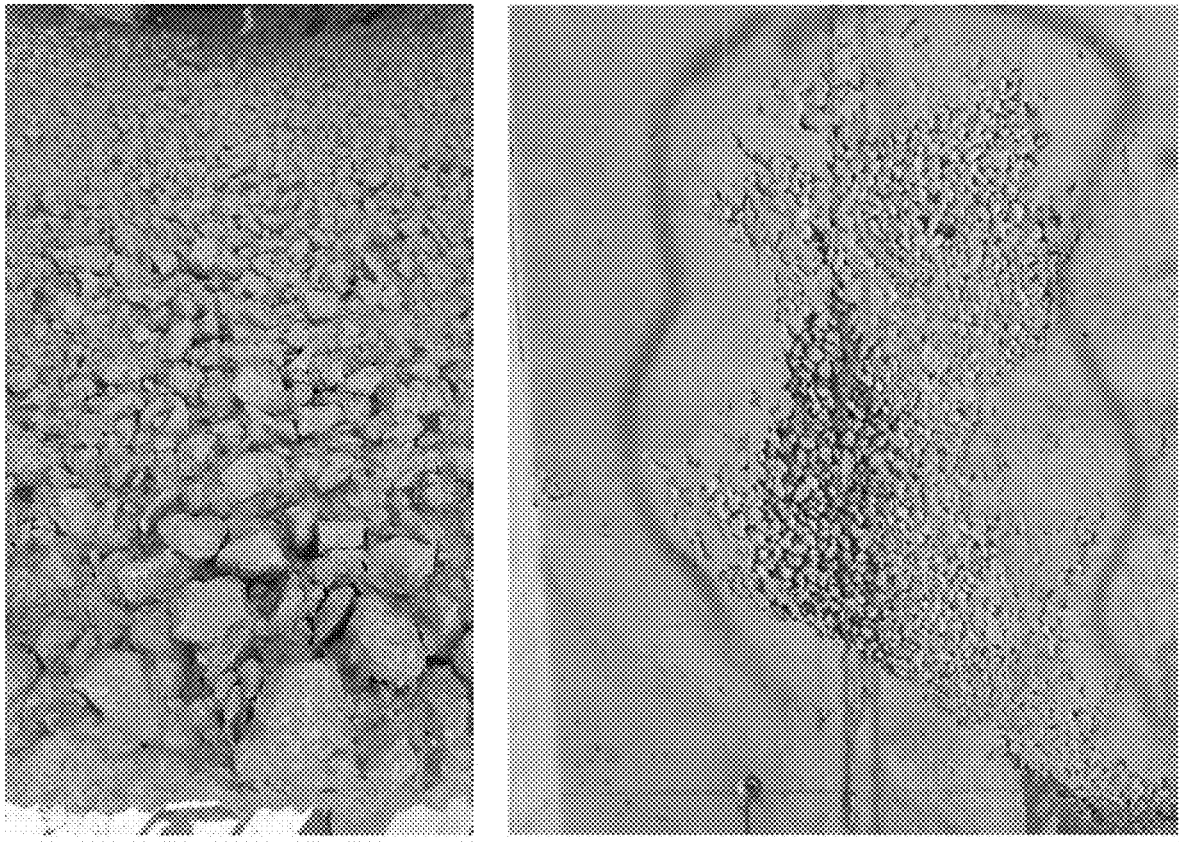
FIG. 8 shows an image of shows an image of an incorrect grading of aggregates in the concrete having a high slump and, therefore a concrete mixture with segregation.
FIG. 9 shows the segregation of the hardened concrete in the wall, in one of the newly built structures.

FIG. 7 shows an image of decomposed concrete having a collapsed slump and a lot of water bleeding and segregation. FIG. 8 shows an image of an incorrect grading of aggregates in the concrete and therefore a concrete mixture with segregation (separations of the concrete components) can be seen. Examples of these failures in concrete preparation essentially impair the durability and quality of the concrete (significantly reduced mechanical strength, water permeability into the structure, corrosion of the iron bars, etc.). FIG. 9 shows segregation of the hardened concrete in the wall, in one of the newly built structures.

In a certain embodiment of the present invention, a concrete imaging and sensor sub-system is installed on the mobile platform and comprises:

(a) At least one imaging, video and thermal camera that continuously gathers visual information, thermal information, and thermal profile of the concrete at any time before transportation, during transportation, prior to discharge and during the discharge of the concrete at a construction site;

(b) An acoustic sensor that continuously examines changes in a sound level, frequency and duration, and a sound of low and full load of the concrete inside the concrete mixer, and thus monitors the workability, homogeneity, cohesion, segregation, and water separation of the concrete;

(c) A hydraulic pressure gauge that indicates a hydraulic pressure of the concrete inside the concrete mixer tank and a hydraulic load intensity on the mixer motor during loading and prior to discharge of the concrete while mixing at a high rotation frequency of the mixer tank from about 5 rpm to about 95 rpm, and during transportation while mixing at a low rotation frequency from about 4 rpm to about 12 rpm, where the hydraulic pressure and hydraulic load intensity are indicators of the workability of the prepared concrete. The hydraulic pressure gauge is therefore configured to provide an additional indication to simulate the workability of the concrete; and (d) A temperature gauge that continuously monitors and controls the concrete temperature and surrounding temperature outside the mixed concrete, and thus monitors a hydration progress, including the degree of hydration, rate of heat of hydration and slump reduction of the concrete, and water absorption by aggregates of the concrete.

An exemplary thermal imaging camera that produces images, videos, thermograms and thermal profiles of the concrete, used in the system of the present invention is a forward-looking infrared (FLIR) camera, which is capable of monitoring the consistency of the fresh concrete or concrete batched mix. This type of cameras does not "see" water in the concrete, but rather visualises the impact water has on the temperature of surfaces around them due to the evaporation process.

In another embodiment, the concrete monitoring and quality control system of the present invention further comprises a tachometer or a revolutions-per-minute (RPM) gauge installed on the truck for indicating a centrifugal force or rotation speed and tracking progress of the concrete mixer tank of the truck, and additional simulation of the slump level.

In the present application, the terms "tachometer" and "RPM gauge" are considered entirely equivalent and used therefore interchangeably. In general, the RPM gauge or tachometer is a device measuring the centrifugal force or rotational speed of a shaft or disk, as in a motor or other machine. In the concrete mixer truck, the RPM gauge measures the centrifugal force or rotational speed of the concrete mixer tank of the truck. This device usually displays the revolutions per minute (RPM) on a calibrated analogue dial, but digital displays are increasingly common and also can be used to indicate mixing or unloading of the concrete and to evaluate the volume remaining in the mixing tank.

The hydraulic pressure gauge and RPM gauge installed on the mobile platform allow an additional indication to simulate the slump level. The control system of the present invention determines the slump level and the slump reduction and an amount of the concrete admixture, which should be added in order to increase and adjust the slump level to the desired level without adding water to the concrete. In addition, the control system determines the volume of concrete left in the concrete tank by calculating the estimated volume discharged (offloaded) by the number of the discharge rounds and a number of empty blade spiral revolutions.

In a particular embodiment, a timeline operation sub-system is installed on the mobile platform and comprises a computing unit configured to:

(1) Receive an input data of concrete from the concrete plant, driver, the external operator, or the autonomous operating system;

(2) Continuously receive and process data from the imaging and sensor sub-system;

(3) Generate an output data on:

quality, consistency, and stability of the concrete being produced in the mixer tank during the transportation and prior to the discharge;

a computed volume of the concrete in the concrete mixer tank computed from an estimated volume discharged by a number of discharge rounds of the tank and by a number of empty blade spiral revolutions;

a concrete temperature and the surrounding temperature;

sound changes that indicate drying of the concrete; and deviations from physicochemical parameters of the concrete production process; and (4) Build a course of actions for the driver, the external operator, or the autonomous operating system in a form of computer commands, in order to maintain desired physicochemical parameters of the concrete production process, and quality, consistency, and stability of the produced concrete.

In a specific embodiment, the timeline operation sub-system is configured to schedule times from the beginning of the concrete production to the final discharge of the concrete at the construction site, to calculate the time intervals and required doses of the chemical admixtures to add during the transportation and according to the instructions from supervisors or autonomous operating system.

In yet further embodiment, the timeline operation sub-system further comprises a communication module installed into or connected to the computing unit and configured to:

continuously receive and process data from the imaging and sensor sub-system in a form of thermograms, images, video and audible or acoustic signals, temperature and temperature gradient, and hydraulic pressure, from said imaging and sensor sub-system, and simultaneously transmit readable information to an external storage device or user's interface in a form of text, graphics, or audible signals, and updating or alerting the user if any action on the user's side is required.

In some embodiments, the communication module is a wireless connection module. It can be either Bluetooth© or NFC providing the short-range wireless communication between the computing unit and an external storage device or the user's interface for up to 20 m. If this module is Wi-Fi, the connection can be established with a network for up to 200 nm, while GSM allows the worldwide communication to a cloud. The external storage device or user's interface may be any mobile device or gadget, such as a smartphone or smart watch. It may also be a desktop computer, server, remote storage, internet storage or cloud. The communication module may be a wireless connection module used as a standalone device or integrated in the computing unit or in the external storage device.

As mentioned above, the present application describes a control and monitoring system for constantly examining the concrete slump and homogeneity, monitoring the decrease of fluidity of the concrete as a function of time and correlating it to the slump or flow level ordered by the contractor. This system monitors the physicochemical properties of fresh concrete by assessing its slump level and homogeneity using image processing and identifying the reasons of the concrete failure while it is still being produced in the concrete system, transporting the concrete in the concrete truck to the construction site and at the time of discharging the concrete into the building structure or pump. The monitoring and adjusting process is continuous, which means it is automatically carried out by the system until the concrete is discharged (offloaded) or prior to that, if so desired.

The concrete monitoring and quality control system allows having a regular image, a video or a thermogram of the concrete to be obtained at any given time and makes it possible, by processing the image, to assess the slump or flow level of the concrete at any given moment and without checking by an operator or quality controller at the construction site, or to detect conditions of defective concrete preparation and improper handling of the concrete mixes containing non-homogeneous concrete, lumps, water bleeding, segregation of aggregates, the slump level too high or too low, and the like.

In particular embodiments, the data generated by the concrete monitoring and quality control system is dependent on thermogram parameters, time, and time intervals of the audible (acoustic) signals, temperature and temperature gradient, and hydraulic pressure.

In a further embodiment of the present invention, the concrete monitoring and quality control system is installed together with other components of the production system on the mobile platform of a truck suitable for transporting the fresh concrete or the batched concrete mix to a construction site and automatically discharging (offloading) the concrete at the construction site.

In yet further embodiment, the concrete monitoring and quality control system of the present invention further comprises an imaging or video camera installed on the mobile platform outside the concrete mixer tank, for monitoring events and activities outside the mixer truck. These events and activities outside the mixer truck comprise activities of factory and construction personnel, factory and laboratory workers and engineers taking samples of the discharged concrete for determining the quality of the concrete, and an operator and driver of the mobile platform.

The adjustment of the slump or flow level is enabled by four major steps of a method encoded by an algorithm of the present invention:

I. Determination of the type of chemical admixture and/or combining admixtures to be fed to the mixer with the rate, dosages, and timetable determined according to the type of cement, quality of aggregates, environmental conditions, time from the beginning of the concrete production, transportation time, hydration rate, and percentage of the main cement components. Amounts of the added chemical admixtures are determined by preliminary tests in the laboratory. The sets of these data are used to train the machine-learning model of the autonomous operating system.

II. Simulation of the slump or flow level and identifying between the actual slump and the desired slump level at any time.

III. Adjustment of the slump level using a chemical admixture (not water) by a concrete monitoring and quality-control system with the aforementioned output data, which can is continuously broadcasted to the driver, the external operator, or the autonomous operating system in a form of computer commands to maintain the desired physicochemical parameters of the concrete production process, and quality, consistency, and stability of the produced concrete.

IV. Visual monitoring of the produced concrete by the driver and/or the external operator and analysis along with the sound parameters, hydraulic pressure and temperature of the changes during the concrete production parameters. As mentioned above, the concrete monitoring and quality control system including the on-board or remote autonomous operating system can be operated by an artificial intelligence based on the machine learning models trained by the present inventors.

In some embodiments, the on-board continuous and ongoing-monitoring and quality-control system is designed to be operated manually or remotely by the driver or the operator. In other embodiments, the on-board continuous-monitoring and quality-control system is designed to be operated by the autonomous operating system with an embedded artificial intelligence based on machine-learning models, without an external control or intervention from the driver or the operator.

The input data for the computing unit is a string or an array of measurements from each camera and sensor of the imaging and sensor sub-system and parameters selected from one or more of the following:

a type of concrete, an amount of the water added before the transportation, during the transportation, prior to the discharge and during the discharge of the concrete, an amount of cement added, a maximum water-to-cement ratio allowed according to the type of the concrete, types and technical characteristics of the different chemical admixtures, a grading and types of the aggregates and their mix, loading times of the materials used for the production of the concrete before the transportation, during the transportation, prior to the discharge and during the discharge of the concrete, a required workability (slump/flow level) of the produced concrete, a required air percentage content data, and an intended concrete application means.

The output data generated by the computing unit are levels of and deviations from the desired quality and stability of the produced concrete in the concrete mixer tank during the transportation and prior to the discharge, are characterised by one or more parameters:

quality, consistency, workability, and stability of the concrete being produced in the mixer tank during the transportation and prior to the discharge;

a computed volume of the concrete in the concrete mixer tank computed from an estimated volume discharged by a number of discharge rounds of the tank and by a number of empty blade spiral revolutions;

a concrete temperature and the surrounding temperature;

sound changes that indicate drying and homogeneity of the concrete; and deviations from physicochemical parameters of the concrete production process.

In still other embodiments, applying the machine-learning model on the input data in the computing unit, the output is a single bit whose value is '0' or '1', or an array of bits, or an array of integers, or an array of complex numbers, wherein said single bit, or said array of bits, or said array of integers, or said array of complex numbers corresponds to one or more of the parameters of said generated output data, thereby building a course of actions for the driver, the external operator or the autonomous operating system to maintain the desired physicochemical parameters of the concrete production process, and quality, consistency, and stability of the produced concrete in the mixer tank.

Non-limiting examples of the algorithms included in the machine-learning models are a support vector machine (SVM) based process, a decision tree-based process, and a deep neural network (NN) process, wherein the deep neural network is one or more models of a convolutional neural network (CNN), a regional CNN (RCNN), and a long-short term memory recurrent CNN (LSTM Recurrent CNN).

In most of the embodiments, the artificial intelligence involves a training process that includes training the machine-learning model with the aforementioned input data sets of the present invention received from the imaging and sensor sub-system, wherein each data set is based on a single time stamp and represents the predictions that will be made by the trained machine-learning model. This training of the machine-learning model correlates the input data with predetermined labels, including the required quality, consistency, and stability of the fresh concrete or the batched concrete mix being produced in the mixer tank during the transportation and prior to the discharge; decrease in quality of the aggregates and change in composition of the produced concrete; a computed volume of the concrete in the concrete mixer tank; a concrete temperature; sound (audible) parameters changes that indicate "drying" and homogeneity of the concrete; required physicochemical parameters of the produced concrete and deviations from the physicochemical parameters of the concrete production process. After being trained, the machine-learning model (e.g., a deep-neural network) predicts a set of actions including adding certain chemical admixtures at specific amounts and at particular intervals of time into the mixer tanks for the driver or the external operator to maintain the desired quality and stability of the produced concrete in the concrete mixer tank.

The levels of and deviations from the required physicochemical parameters of the produced concrete and the corresponding required examples of actions are summarised in the following table:

| Physicochemical parameter changes | Required actions |
|---|---|
| A workability reduction of the concrete and changes in the desired slump/flow level as a result of increased pressure on the mixing motor or increased temperature, increased sound degree level and image analysis | A specified amount and type of a chemical admixture is to be added to the concrete in the mixer tank without addition of water. |
| A bonding time with the cement | 1) Addition of hydration stabilizer and chemical dispersion admixture as a function of time from the beginning of the concrete production and also adding in certain amounts and at certain intervals of time, for example adding hydration stabiliser at several time intervals and adding dispersion admixture after about 5 to 20 minutes from the beginning of the concrete production in the mixer tank. <br> 2) Adding a cement accelerator before unloading the concrete upon arrival at the construction site. |
| A desired initial concrete strength or fast/slow setting times. | A rate profile (delay or acceleration) for the addition of an admixture is to be changed, selected, and applied. |
| An air content of the concrete in the mixer tank | Addition of an air entrapped agent through a foam generator system at the beginning of concrete production with the first 40-80% water or during the transportation or upon arrival at the construction site. |
| A degree of hydration as a fraction of cement that has fully reacted with water during the binding process. | A one-time addition of a certain amount of a hydration stabiliser admixture at the beginning of the production process and during the transportation of the concrete at the certain time intervals and according to the indication from the imaging and sensor sub-system and the time remained until the concrete is discharged at the construction site. |
| The fineness of the produced cement upon mixing with water, a rate of a heat evolution of the cement in the concrete and viscosity of the concrete | A corresponding dosage amount, a number of dosages, a time interval between the dosages and a rate of addition of a hydration stabiliser into the mixer tank is to be changed, selected, and applied. |

Figure 10:
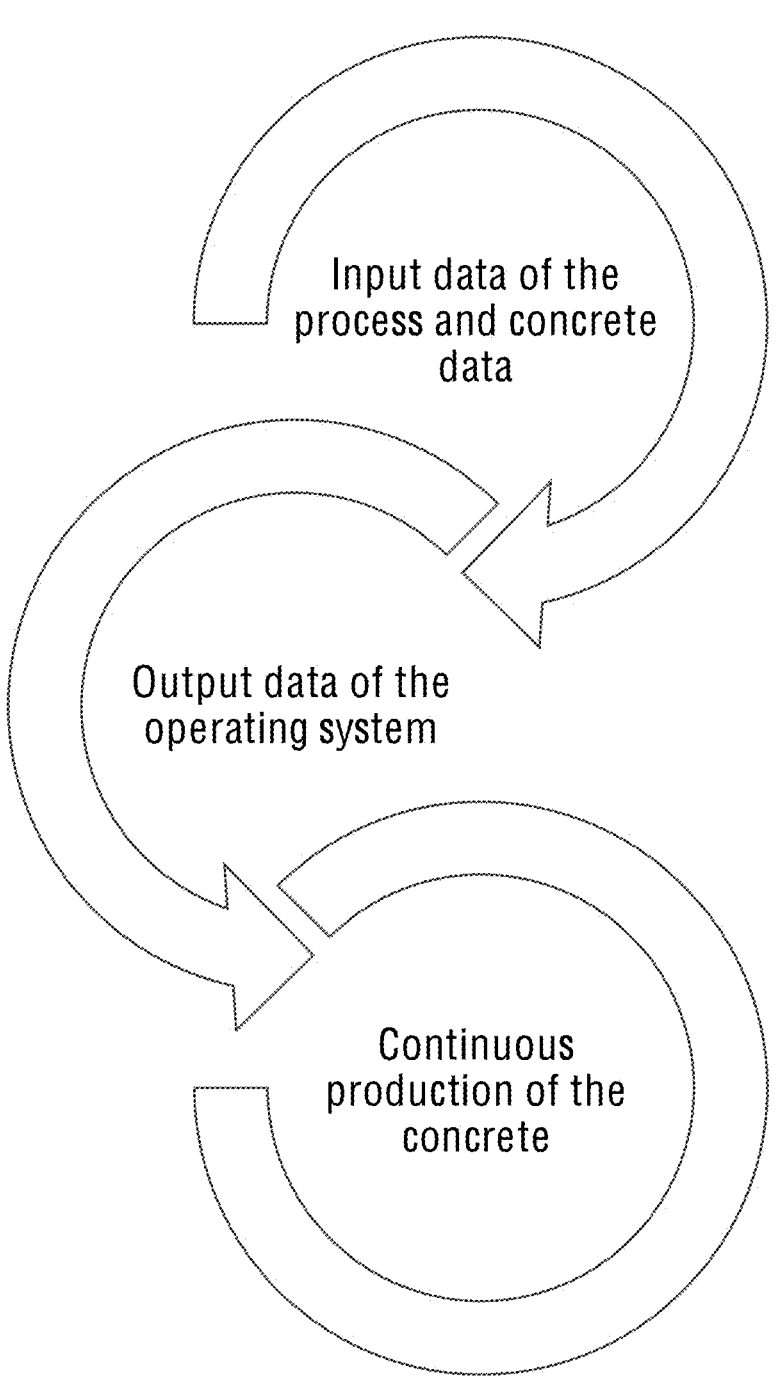
FIG. 10 schematically shows the concrete production process of the present invention.
Figure 11A:
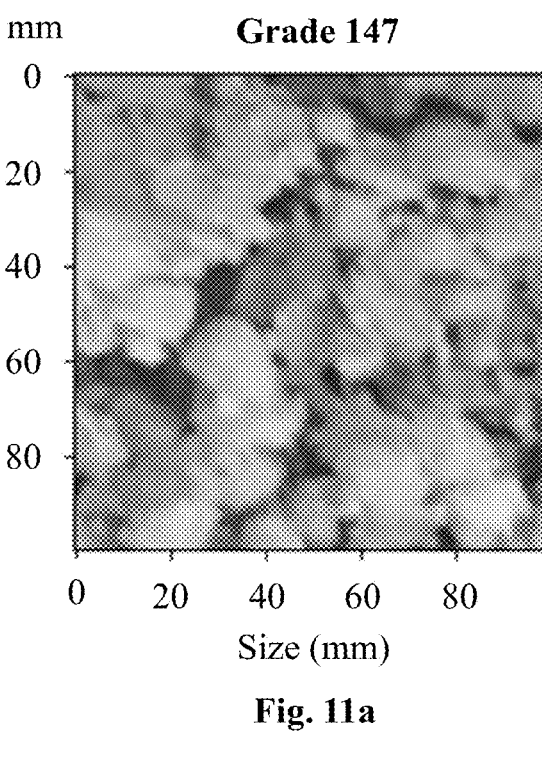
Figure 11B:
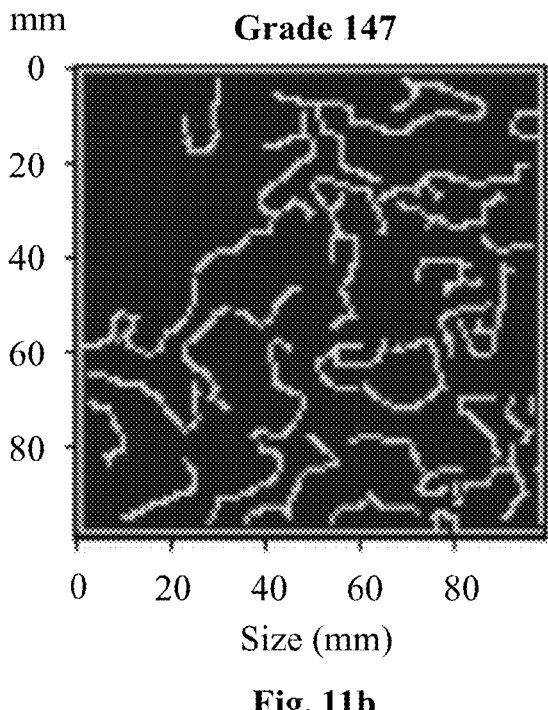
Figure 11C:
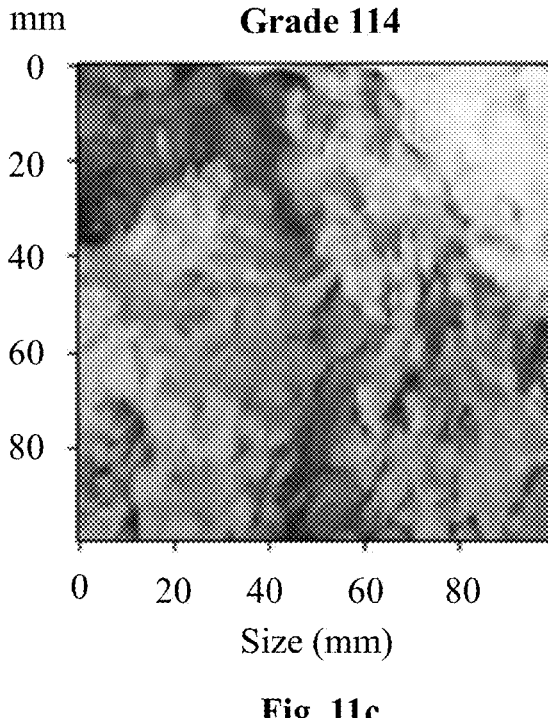
Figure 11D:
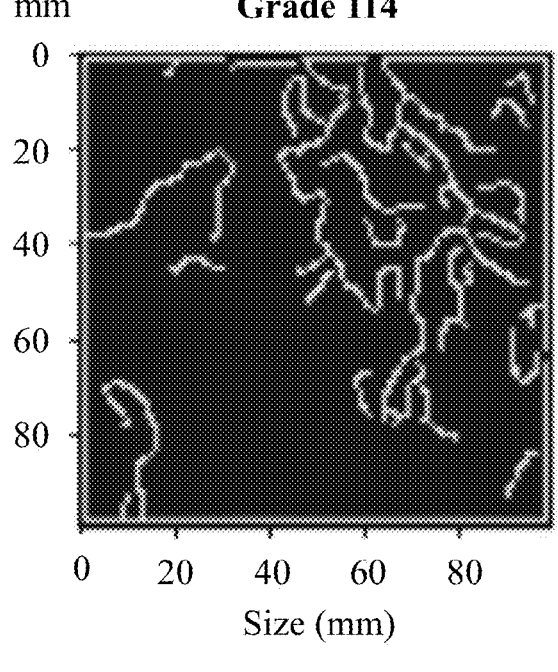
Figures 11E, 11F, 11G, 11H:
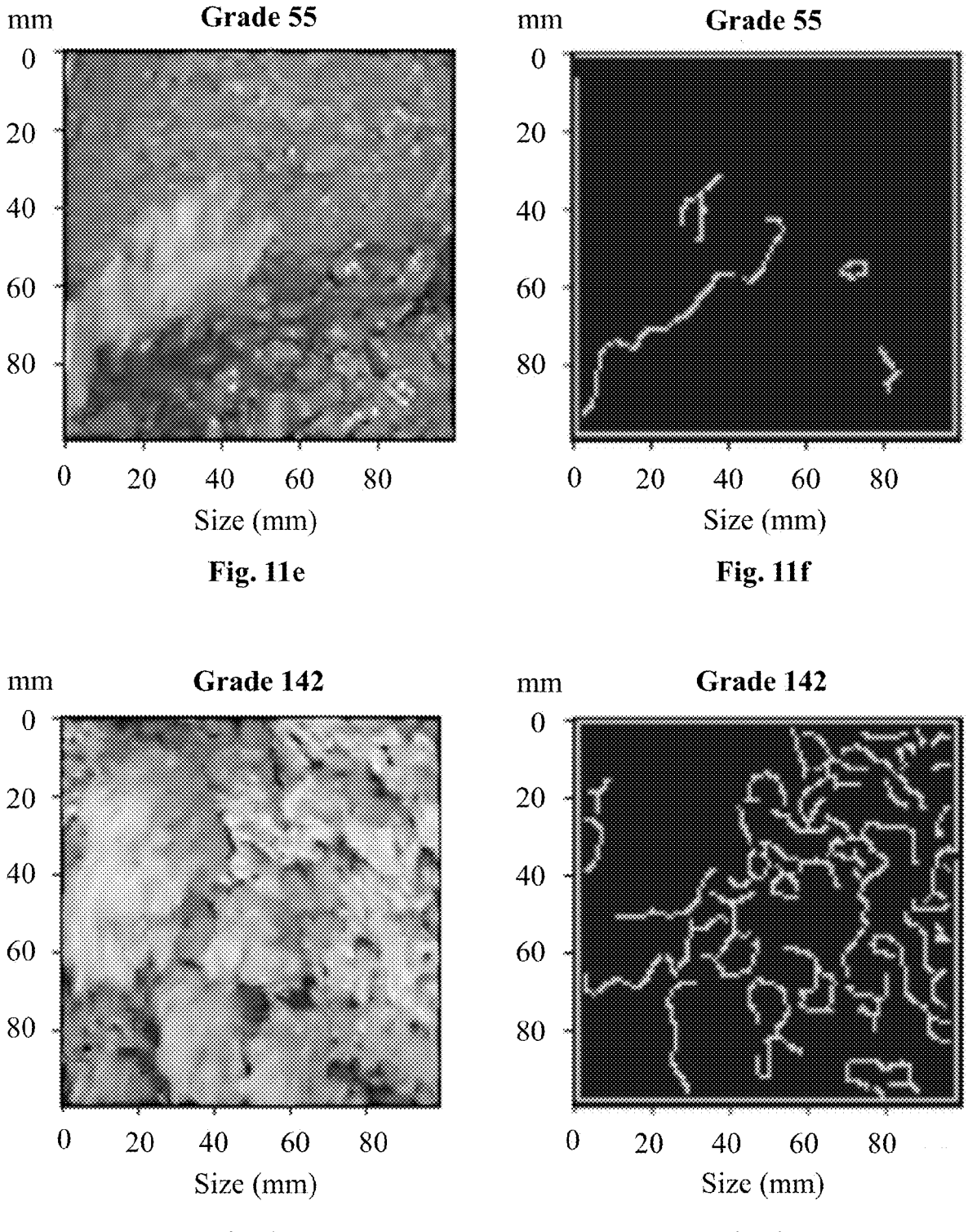

FIG. 10 schematically shows the concrete production process of the present invention. Thus, the actions required from the driver, external operator or autonomous operating system are to add water, a chemical dispersant or the chemical admixture containing said dispersant to the concrete mixer tank, in an amount computed by the computing unit to maintain or adjust the desired quality and stability of the produced concrete, and further perform a re-inspection. The user or operator is alerted upon receipt of the information about the decrease in the quality of the aggregates and the change in the composition of the produced concrete.

Using a closed control circuit that receives slump data and slump decrease at any time, it is possible to adjust the concrete mixture fluidity and homogeneity by adding a suitable chemical admixture, such as a chemical dispersant, to ensure concrete supply at the desired slump level and without uncontrolled addition of water at the construction site. This will impart much better control of the quality of the concrete.

In another aspect of the present invention, a method for continuous monitoring and quality control of a production of a fresh concrete or a batched concrete mix in a concrete mixer tank, said method comprising:

(a) Continuously gathering visual information, thermal information, and thermal profile of said fresh concrete or said batched concrete mix at any time before transportation, during the transportation, prior to discharge and during the discharge of the concrete through a mixer trough at a construction site with at least one camera selected from an imaging camera for taking images, a video camera for taking videos, and a thermal imaging camera for generating thermograms and thermal profile;

(b) Continuously examining changes in a sound level (dB), frequency (Hz) and duration, and a sound of low and full load of the concrete inside the concrete mixer with an acoustic sensor installed on the mixer tank and estimating a slump level (workability) of the concrete and monitor cohesion, homogeneity, segregation, and water separation of the concrete;

(c) Continuously indicating a hydraulic pressure of the concrete inside the concrete mixer tank and a hydraulic load intensity on the mixer motor with a hydraulic pressure gauge installed on the mixer tank, during loading and prior to discharge of the concrete, while mixing at a high rotation frequency of the tank from about 5 rpm to about 95 rpm, and during transportation while mixing at a low rotation frequency from about 1 rpm to about 4 rpm, thereby indicating and simulating the workability of the concrete;

(d) Continuously monitoring and controlling the concrete temperature and surrounding temperature outside the mixed concrete with a temperature gauge, thereby monitoring a hydration progress, including the degree of hydration, rate of heat of hydration and slump reduction of the concrete, and water absorption by aggregates of the concrete;

(e) Continuously indicating a centrifugal force or rotation speed and tracking progress of the concrete mixer tank with a tachometer or a revolutions-per-minute (RPM) gauge installed on the tank, thereby providing computation of a volume of the concrete in the concrete mixer tank and additionally simulating the slump level;

(f) Receiving an input data of the concrete loaded and mixed in the mixer tank from a human operator or user, or from an autonomous operating system on a computing unit;

(g) Continuously receiving and processing data from Steps (a) to (d) on the computing unit;

(h) Generating an output data on:

quality, consistency, workability, and stability of the concrete being produced in the mixer tank during the transportation and prior to the discharge;

changes in quality and composition of the produced concrete;

a computed volume of the concrete in the concrete mixer tank computed from an estimated volume discharged by a number of discharge rounds of the tank and by a number of empty blade spiral revolutions;

a concrete temperature;

sound changes that indicate drying of the concrete; and deviations from physicochemical parameters of the concrete production process; and (i) Building a course of actions for the driver, external operator or autonomous operating system in a form of computer commands to add water, a chemical dispersant or said one or more chemical admixtures to the concrete mixer tank, in specific amounts and at particular intervals of time as computed and indicated by the computing unit, in order to maintain or adjust the desired physicochemical parameters of the concrete production process, and quality, consistency, and stability of the produced concrete, and further perform a re-inspection.

In one embodiment, the input data of concrete in the aforesaid method of the present invention are selected from one or more parameters:

a type of concrete, an amount of the water added before the transportation, during the transportation, prior to the discharge and during the discharge of the concrete, an amount of cement added, a maximum water-to-cement ratio allowed according to the type of the concrete, types and technical characteristics of the chemical admixtures, a grading and types of the aggregates and their mix, loading times of the materials used for the production of the concrete before the transportation, during the transportation, prior to the discharge and during the discharge of the concrete, a required workability (slump or flow level) of the produced concrete, a required air percentage content data, and an intended concrete application means.

In another embodiment, the physicochemical parameters of the concrete production process in the method of the present invention are selected from the group consisting of:

a slump or flow level (workability) reduction of the concrete computed from a slump simulation and continuous changes in the slump level with time;

an amount and type of said one or more chemical admixture to be added to the concrete in the mixer tank in accordance with required specifications of the prepared and mixed concrete and the properties of aggregates and cement used for the production of the concrete, in order to maintain or adjust a specified workability of the concrete to a required level without addition of water;

a bonding time with cement;

an initial and final setting times of the concrete;

a rate profile (delay or acceleration) for addition of an admixture in order to maintain or adjust to a required level of the desired concrete strength;

an air content of the concrete in the mixer tank;

a degree of hydration of the concrete to a predetermined level computed from the visual information, thermal information, and thermal profile of said concrete and computed as a fraction of a chemical clinker that has fully reacted with water during the binding process;

a fineness of the produced cement upon mixing with water affecting a rate of a heat evolution of the cement in the concrete and viscosity of the concrete, said heat evolution is proportional to a change in the concrete viscosity during the concrete production process, and said parameters are used to compute a dosage amount, a number of dosages, a time interval between the dosages and a rate of addition of a hydration stabiliser into the mixer tank; and a homogeneity and consistency of the concrete including presence of the aggregates in the concrete, density and concrete height, size, shape, and colour of the aggregates inside the concrete, water bleeding, and segregation of the concrete.

In a further embodiment, the physicochemical parameters of the concrete production process in the method of the present invention are correlated in a computing unit:

with an amount of water to add to the concrete in the concrete mixer tank in order to reach a required water-to-cement ratio and not to exceed this ratio; and with an amount of a chemical admixture to continuously add to the produced concrete at predetermined dosages and intervals of time, to disperse said concrete and thereby, increase the slump level of the concrete to the desired slump level, without adding water.

In yet further embodiment, the chemical admixtures used in the method of the present invention are selected from the group consisting of:

(a) A chemical dispersant suitable for dispersing a concrete mixture and thereby maintaining the desired slump levels of said physicochemical parameters of the concrete;

(b) A cement accelerator suitable for speeding a setting time and consequently, a cure time of the cement, accelerating hydration of the cement binding with water, adjusting a rate and a degree of the binding reaction of the cement and water in the presence of a chemical clinker used as a binder for producing the cement upon mixing with water, and preventing freezing of water in the concrete in cold areas;

(c) A viscosifier suitable for increasing viscosity of the fresh concrete or the batched concrete mix, thereby causing a reduction in water excretion and segregation, and increasing homogeneity of the concrete;

(d) An air entrainer surfactant for air entrapment, suitable for increasing the air content in the concrete and adjusting viscosity of the concrete; and (e) A hydration stabiliser formulated to retard the concrete production over extended periods of time.

In still another embodiment, the autonomous operating system used in the method of the present invention is installed inside the computing unit and comprises an embedded artificial intelligence based on machine-learning models, without and external control or intervention from the driver or the operator. Upon applying the machine-learning model on the input data in the computing unit, the output is a single bit whose value is '0' or '1', or an array of bits, or an array of integers, or an array of complex numbers, wherein said single bit, or said array of bits, or said array of integers, or said array of complex numbers corresponds to one or more of the parameters of said generated output data, thereby providing a course of actions for the human operator or user, or the autonomous operating system in a form of computer commands to maintain the desired physicochemical parameters of the concrete production process, and quality, consistency, and stability of the produced concrete.

In some embodiments, the artificial intelligence used in the method of the present invention involves a training process that includes training the machine-learning model with the aforesaid input data sets, each data set is based on a single time stamp and represents the predictions that will be made by the trained machine-learning model. Said training of the machine-learning model correlates the input data with pre-determined labels, including the quality, consistency, and stability of the concrete being produced in the mixer tank during the transportation and prior to the discharge; decrease in quality of the aggregates and change in composition of the produced concrete; a volume of the concrete in the concrete mixer tank; a concrete temperature; sound changes that indicate drying of the concrete; and deviations from physicochemical parameters of the concrete production process.

In a particular embodiment, the aforesaid machine-learning model, after being trained, predicts a set of actions, including adding one or more chemical admixtures in specific amounts and at particular intervals of time into the concrete mixer tank, said one or more chemical admixtures are selected from the group consisting of:

(a) A chemical dispersant suitable for dispersing a concrete mixture and thereby maintaining the desired slump levels of said physicochemical parameters of the concrete;

(b) A cement accelerator suitable for minimising a setting time and consequently, a cure time of the cement, accelerating hydration of the cement binding with water, adjusting a rate and a degree of the binding reaction of the cement and water in the presence of a chemical clinker used as a binder for producing the cement upon mixing with water, and preventing freezing of water in the concrete in cold areas;

(c) A viscosifier suitable for increasing viscosity of the fresh concrete or the batched concrete mix, thereby causing a reduction in water excretion and segregation, and increasing homogeneity of the concrete;

(d) An air entrainer surfactant for air entrapment, suitable for increasing the air content in the concrete and adjusting viscosity of the concrete; and (e) A hydration stabiliser formulated to retard the concrete production over extended periods of time.

In a specific embodiment, the exemplary concrete production process of the present invention, including the sensing, control, and operation of the system comprises the following actions:

1. Recommended order of loading:

a) Addition of all the aggregates and sand with 60-80% of the total water. It is mixed until a uniform mixture is obtained to allow maximum water absorption by the aggregates plus sand and then the required cement amount plus 0.1%-0.5% hydration stabiliser (retarder). The amount of hydration stabiliser (retarder) is added according to the solid content and chemical type of the hydration stabiliser (retarder). It is recommended that approximately half or a third of the total hydration stabiliser (retarder) be needed in the concrete.

b) Adding the aggregates, sand, and cement plus 0.1%-0.5% hydration stabiliser (retarder). The amount of hydration stabiliser (retarder) is added according to the solid content and chemical type of the hydration stabiliser (retarder). Approximately half or a third of the total retarder needed in the concrete is recommended.

c) Two initial times are taken in the input data of the system: the time contact of water with the aggregates and the time contact of water with clinker/cement.

2. The maximum water-to-cement ratio which is defined in the control system according to the type of concrete (Max W/C).

During all the stages from the beginning of the concrete production and during the concrete's transportation and discharge, the system continuously computes the total added water to the mixer, including the water amount in the admixtures, to estimate the ongoing water cement ratio. The system will not allow the water-cement ratio to increase above the allowed maximum of the water-cement ratio.

3. Dosages of admixtures are added according to the experience gained, the machine learning model trained, or the first tests performed in the laboratory.

4. A maximum allowed water-to-cement ratio is determined for each type of concrete.

5. A computation is made considering the total water added to the stationary system mixer and during the aggregates' transportation and moisture. The computed water is determined by reducing the water absorbed by the aggregates and sand.

6. The concrete mix data, the aggregate and sand data, the type of concrete, the required slump/flow, the needed strength, and the amounts of water and admixtures added to the mixer are recorded and displayed by the system. In addition, the data of the various sensors are monitored from the beginning of loading until the end of the discharge of the concrete.

7. Data from the sensor system are gathered and visual observation of the concrete in the mixer tank is performed from the loading and discharge of the concrete.

8. Continuous and ongoing production is enabled by both manual and automatic operation.

9. In automatic or manual mode, limiting changes and additions of materials are possible only after receiving approval from a qualified entity.

10. The system has a range of allowed quantities of the materials to be added.

11. A contractor can use the concrete monitoring and quality control sub-system of the present invention at the construction sites to assess the quality, consistency, and stability of the fresh concrete received at the construction site.

12. The concrete monitoring and quality control sub-system of the present invention can be used together with the stationary concrete system to control the properties of the concrete before its uploading for the transportation to the construction site.

In another specific embodiment, the system exemplary initialisation process of the concrete production or starting work with the system can be done in several ways:

Manual work—adding the admixtures manually and not automatically by the mixer operator during the transportation or upon arrival at the construction site or by another operator on behalf of the concrete system or, with his approval, by observing the concrete being mixed by the mixer. Before adding the admixtures and after adding the admixtures, the workability data of the mixture and other data, such as setting times, strength development, cohesion of the mix, etc., will be entered into the learning system.

Full production of the various mixes in the stationary system as a learning process of the AI system—the production of the concrete mixtures will be in the concrete system. The concrete data from loading to unloading will be written. At the same time, the AI system analyses the concrete performances from the system to unload the concrete, such as workability level. In this way, the system will connect the received sensor data and the data of the mixture produced by the loader in the system. The system will learn the data and analyse it. In the next step, it will be possible to create automatically (in the first step of the pilot, the actual addition of the additives, only after approval by a qualified entity).

The system of the present invention allows:

(1) Reducing the amounts of chemical admixtures used in the process.

(2) Cost reduction of expensive chemical admixtures, which are normally added to the concrete in the system.

(3) Working with lower-quality and lower-cost aggregates.

(4) Prevention of manual intervention in the concrete production by an operator, a driver, or any other person working with the concrete, including adding water to the batched concrete at the construction sites, and reducing the safety factors.

(5) Continuous monitoring of the concrete quality and controlling the concrete properties in addition to the slump and flow levels, such as segregation and water bleeding, throughout the concrete production during its transportation and offloading at the construction sites, and not only in the stationary concrete systema before the truck leaves.

(6) Better control of cement contact times and air content and reducing the amount of cement used (possibility of reducing the ratio of water to cement) by more intelligent use of chemical admixture throughout the production and transportation.

(7) Production of concrete in a lower slump and increasing it before the concrete discharge (offload). This results in savings in an additional concrete cost. Maintaining the homogeneity of the concrete batched mix and preventing water bleeding.

(8) Supervision and control of operations at the construction sites upon offloading of the fresh concrete or the concrete batched mix.

(9) Development of the system of the present invention for contractors' companies to simulate and control the concrete delivered by the concrete companies.

(10) Improved quality control of the produced concrete.

(11) Altering the composition of aggregate mixtures in the production of concrete depending on the quality of the aggregates and sand obtained and neutralizing the negative effect of pozzolanic materials.

(12) Maintaining the stability of concrete properties over a longer period of time

(13) adjusting the desired setting times of the concrete through the transportation and the use of retarders.

(14) The ability to use various types of admixtures to produce all types of concrete in the desired properties in the building sites.

(15) The ability to have stable air content in the construction site.

(16) The ability to have stable properties in all types of weather.

(17) The ability to have stable properties of the concrete using all types of cement (I, II, III etc.) and using different types of chemical additives and pozzolanic and other active materials such as fly ash, slag, limestone powder, oil shale metakaolin etc.

(18) The ability to reduce cement amount significantly.

The concrete monitoring and quality control system of the present invention has a number of notable pros:

1) Avoiding addition of water to the concrete mix at the construction site, in order to disperse the concrete in an uncontrolled manner. That will reduce the number of failures in the mechanical strength of the concrete and allow the reduction of cement and reduction of safety factors.

2) Reducing the safety coefficients or the amount of cement in the concrete mixture, thus reducing considerable cost and environmental pollution which is reflected in the low consumption of cement.

3) Ability to control the quality of the concrete by determining the fixed water-to-cement ratio, and further adding a chemical admixture (dispersant) (instead of water) that would allow stability and control of the concrete properties.

4) Control and monitoring of the concrete mixture throughout the entire transportation and at the construction site by the concrete productioner, wherever the concrete is located and during all time of its transportation and use.

5) Savings in expensive chemical admixtures used to maintain the proper slump level.

6) Full control and monitoring of the concrete condition by a concrete productionr or building contractor.

7) Ability to produce stable concrete mixture having stable performances.

8) Ability to produce concrete having the proper desired performances of the concrete defined by the contractors and the workers in the construction sites.

CONCLUSIONS

1. According to the present invention, the fresh concrete or the batched concrete mix is produced at the desired/final degree of subsidence with all material, additives and the chemical admixtures in the stationary system and only repaired or adjusted, control and maintenance of permanent and stable properties will be carried out by using the specified different admixtures according to the condition of the concrete, before or during the unloading of the concrete at the construction site.

2. The concrete is not produced with the chemical admixtures in full or at all in the stationary production system, but only partially or without any admixtures, which will be added to the mixer during the transportation or/and at the end of transporting to the concrete mixer. For example, combining one retarder dose in the stationary system and after a certain time (for example 5 minutes from the initial mixing of the cement with water) another retarder dose, after a certain time (for example 5 to 15 minutes and during the transportation) full content with a workability improver admixture or in small portions every certain time periods, or full content upon arrival at the construction site, the types and dosage will be defined according to the time of transportation, the amount, and properties of all the raw materials in the concrete, environmental conditions, the desired performances of the concrete in the construction site, and the type of the concrete and the casted element.

3. The basis of the idea is the ability to combine the various admixtures in the effective time periods to obtain the highest effectiveness for the concrete while saving raw materials and having the minimum negative impact on the environment, and maintaining the stability of the properties of the fresh concrete until it is placed in the building element.

A. In order to increase the effectiveness of the admixtures, the concrete will be produced with a partial content or not at all, but after a few minutes after the first mixing of the cement with water to have the maximum effect of the admixtures of retarder and at the end of loading all the components, an additional dose of retarder is added and it is possible to add another dose of retarder after another time range and according to external conditions, the rate of hydration, delays in work and travel, etc.

B. A water reducer admixture (dispersion) is used fully in the stationary system or partially or not at all in the stationary system. To have a better effect the water reducer admixture will be added after a certain time (between 5 to 15 minutes after mixing the cement and water for example) and during the transportation and finally before unloading the concrete at the construction site, if needed. The content of the admixtures and the combined types of chemical admixtures is added during the transportation or/and at the end or during the unloading of the concrete according to the required settlement.

4. It is recommended to make the concrete by adding all the aggregates and sand together with the water, mix for several minutes for the water to be absorbed by the aggregates, mix and then add the cement. At the end of adding the cement to the mixer and the water content to reach the appropriate water-to-cement ratio according to the type of concrete, the mixer leaves the stationary system towards the construction site. During the transportation and after a few minutes, add another dose of retarder and after the water reduce admixture.

5. Adding the admixtures at the construction site, in the required dosage and ensuring that the admixtures enter the concrete by addition of about 2-5 litters (calculated according to the water added in the stationary system and according to the required final water-to-cement ratio).

6. The production and control system includes the admixtures system and a control system, a camera, a sound sensor, a temperature gauge, and a load gauge on the mixer motor. The whole system provides an indication of the condition of the concrete together or separately from the stage of loading the mixer until the final discharge of the concrete at the construction site. The data can be seen by the operating driver and by any person authorized by the factory.

7. All the data provided by the sensor system and the image of the concrete can be observed by a driver (operating the system at the construction site and while driving), a loader/order of the concrete system or the system engineer. The operation can be carried out by the mixer driver, or any other remote person qualified by the concrete system. The addition of the admixtures will be done only after the approval of an appropriate authority on behalf of the production system.

8. By using a camera directed into the concrete mixer and another camera outside the mixer, it is possible to follow by directly observing the concrete inside the mixer and during its pouring at the construction site, including observation of the concrete sample and the way the concrete is applied in the element, if possible.

9. Chemical admixtures can be added and should be added by several parties and according to the permissions granted by the concrete plant—by the mixer driver, the stationary system loader, the system technologist. That means the ability to add and open faucets on top of the truck or remote control. The system will make it possible to add the number of admixtures in the range of prescribed dosages and in accordance with tests carried out in the past or from past experience.

10. Combination of admixtures according to the rate of water absorption by the aggregates, according to the rate of hydration (decrease during the trip) and according to the degree of hydration that has already formed and to have significantly more flexibility in required performances as retardation of the concrete in hot weather or long transportation time and having fast setting.

11. Combining admixtures along the transportation and/or upon arrival at the site increases the effectiveness of the chemical admixtures. The dosages will be determined according to the transport time, external conditions, the type of concrete, the quality and quantity of the various raw materials, the quantity and type of cement, the quantity and type of cement substitutes, the ratio of water to maximum cement, etc.

12. The proposed process enables the reduction of the amounts of admixtures used due to the loss of their effectiveness when they are added in a stationary system, due to absorption of the admixtures by aggregates, hydration products, the heat of hydration over time and the use of simpler and low-cost admixtures.

13. There is a possibility of substantially reducing cement and maintaining a water-to-cement ratio to obtain the required strength and requirements. Maintaining and increasing the workability will be done during the trip or toward the time of unloading the concrete.

14. There are several stages in cement hydration and at different rates of hydration and cement components depending on time. The retarder doses and quantities will be added in a continuous process and in different quantities accordingly.

EXAMPLES

FIGS. 11a, 11c, 11e, 11g, 11i, 11k, 11m and 11 show the images of the fresh concrete having different grades. The numerical grade of the concrete seen in these figures is a combined parameter indicating the physical properties of the concrete, such as consistency (fluidity), segregation and homogeneity, and different slump levels. The lower the grade, the more fluid and homogeneous concrete and the higher the slump.

FIGS. 11b, 11d, 11f, 11h, 11j, 11l, 11n and 11p show the corresponding images processed by an algorithm in the computing unit for each and every grade using the filter that identifies the shade contours of the images using the image pixels hue levels. That gives an indication of the levels of consistency and homogeneity (fluidity) and slump of the concrete by correlating these measured levels to the level of consistency, homogeneity and slump determined by the relevant standard.

Figure 12:
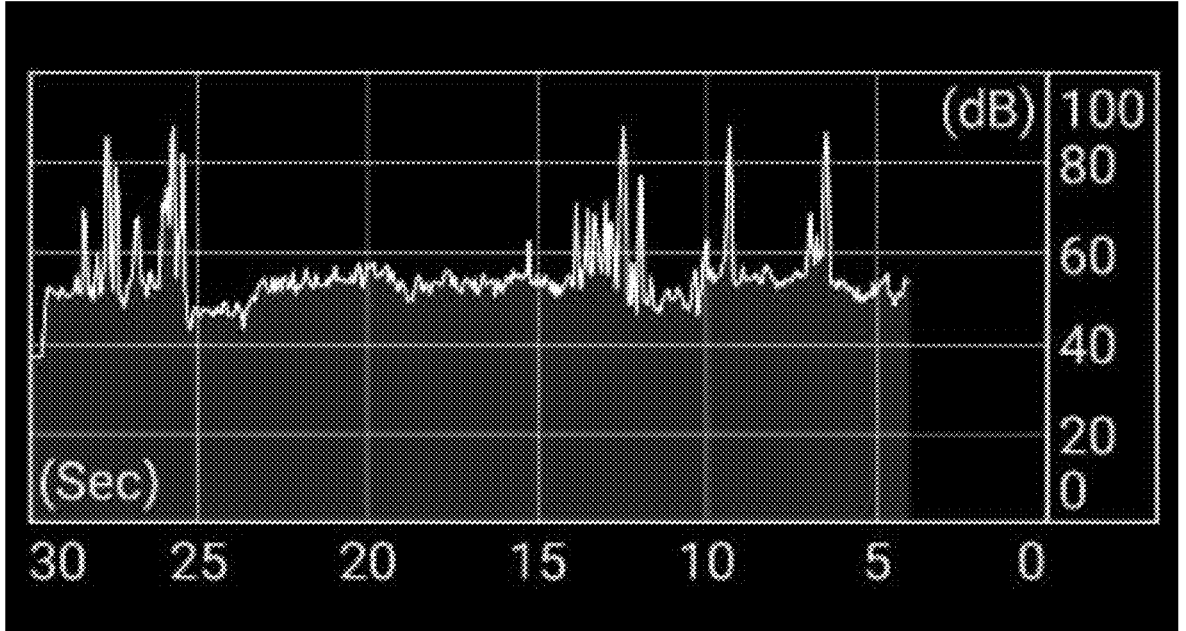
FIG. 12 shows an example of the sound intensity measurement with an acoustic sensor during the mixing of the concrete.
Figure 13A:
FIG. 13*a* shows a thermogram made with a thermal imaging camera of an inhomogeneous concrete mix in the mixer tank and water separation of the concrete.
Figure 13B:
FIG. 13*b* shows a thermogram made with a thermal imaging camera of concrete during its mixing in the mixer tank.

FIG. 12 shows an example of the sound intensity measurement with an acoustic sensor during the mixing of the concrete. FIG. 13a shows a thermogram made with a thermal imaging camera inside the concrete mixer tank of an inhomogeneous concrete mix in the mixer tank and water separation of the concrete. FIG. 13b shows a thermogram made with a thermal imaging camera of concrete during its mixing in the mixer tank.

Below are several examples of the concrete production process using the system of the present invention, during the transportation (conditions, actions, and possible reactions).

Example 1: Hydration Stabilisation of the Concrete Hydration Process (1) The system of the present invention includes time data from the beginning of the production process in the stationary plant (from water to cement ratio contact) until the final discharge of the concrete and the calculation of the time from the start of production and the calculation of the estimated time until the discharge of the concrete.

The addition of a retarder to the concrete according to time, temperature change of the concrete, estimated time remaining for the concrete unloading at the construction site, change of sound analysis indications, and image during the concrete transport to the construction site.

(2) Chemical admixtures:

(i) The first dosage of retarder is added to the mixer in the stationary plant with the addition of the aggregates, cement, and water. A content of 0.1%-0.5% (percentage by weight of the cement content and depending on the portion of the active substance in the inhibitor).

(ii) A second retarder dose is added after 5-10 minutes of water-to-cement ratio contact during the transportation of the concrete. The waiting time before adding the retarder will be until the rate of temperature increase moderates, but no more than 10 to 15 minutes from the contact of the water and the cement (end of reaction of C3A and C4AF).

(iii) According to three possible situations, a three-dose retarder may be added during transportation:

1) Estimated delay of the concrete casting for more than an hour.

2) Indication of the change in the concrete's workability obtained from image processing, sound, and hydraulic pressure.

3) The ability to add a retarder according to the maximum allowed according to a definition input in the control system and according to the operator's opinion or accumulated experience. A 0.05%-0.2% content can be added as a third addition.

(iv) During the transportation, depending on the time remaining until unloading and the expected time depending on unloading (for example, using a concrete container will take a long time compared to unloading using a pump), a water reducer (increases slump) will be used and not a hydration stabilizer. Dosage of water reducer 0.1%-0.5% (percentage by weight of the cement content and depending on the portion of the active substance in the water reducer).

Example 2: Increasing the Workability of the Concrete (1) The system of the present invention includes time data from the start of production in the stationary system (water-to-cement ratio contact) until the final discharge of the concrete and the calculation of the time from the beginning of production and the analysis of the estimated time until the release of the concrete.

Addition of water reduced to concrete according to time, temperature change of the concrete, estimated time left for the concrete to discharge at the construction site, change of sound analysis, picture during the transport of the concrete to the construction site, and hydraulic pressure of the engine.

(2) Chemical admixtures:

(i) Water reducer admixture will be added 5-20 minutes after mixing the water and cement (contact water to cement). During the addition of the admixture, the workability of the concrete will be controlled using the sound sensor and video/image. The dosage of the admixture is 0.5%-2.0% (percentage by weight of the cement content and depending on the percentage of the active substance in the water reducer). The Water reducer admixture can be added with the starting water, but the effectiveness of the Water reducer admixture will be reduced compared to adding it after 5 to 20 minutes from the start of mixing.

(ii) During transportation, a water reducer will be added to 0.05%-0.4% (% wt. of the cement) if the slump is reduced.

(iii) Upon arrival at the construction site and before unloading the concrete, the workability will be compared to the desired one. An additional amount of admixture will be added, if needed, in the range of 0.05%-0.4%, depending on the time and condition of the concrete.

(iv) In situations where the same concrete mixer has to provide a specific volume with low workability (for example, casting stairs) and then offer concrete with higher workability. The concrete is produced with low workability, and depending on the volume of the concrete that is left, the admixture is added to the mixer in a dose of 0.1%-0.5% of the amount of cement left in the mixer.

Example 3: Segregation and Water Bleeding from the Concrete (1) The system of the present invention includes sound, video, and temperature data of the concrete during transportation, particularly before and during the discharge of the concrete.

(2) Chemical admixtures:

(i) Adding a viscosity modifying admixture (VMA) to the mixer before unloading the concrete—in the construction site, if the segregation and water bleeding are noticed and determined, a VMA can be added to the mixer in the amount of 50 grams to 500 grams per cubic meter and to continue mixing for 0.5-1 min per cubic meter of concrete in the mixer. The concrete in the mixer will be tested before pouring it on the construction site by visual and sound examination.

(ii) If the workability of the concrete will be reduced because of the VMA addition, a water reducer admixture can be added in the amount of 0.5%-0.3%.

Example 4: Increasing the Percentage of Air in the Fresh Concrete (1) The system of the present invention includes:

(a) Air admixtures with 60-85% of the water will be mixed for 0.5-3 min, and then the rest of the concrete raw materials will be loaded.

(b) The admixture can be used with the initial water (step i) after loading the concrete and mixing the concrete for 5-15 min.

(c) The adding admixture can be efferently added using a foaming system instead of directly adding the liquid admixture to the mixer.

(d) Upon arrival at the construction site or approaching the construction site, image processing is used to examine the change in the workability of the concrete and the volume of the concrete that has increased due to the addition of the air-entrained admixture, including the colour change, sound, estimate the volume change by image analysis and temperature sensor.

(2) Chemical admixtures:

(i) Add a dosage of 0.1% to 0.8% of the cement amount of air entrapment admixture to increase the air percentage between 5%-7%. If a high air content is needed, add an amount accordingly and by the productionr's instructions.

(ii) Depending on the air test that will be done at the construction site, it is possible to add 0.3%-0.1% of air entrapment admixture to further increase the air content (0.1% for every 1% of air that is required to rise).

Example 5: Acceleration of the Concrete Binding (1) The system of the present invention includes the required acceleration data, the concrete temperature, the ambient temperature, the amount of retarder and water-reducing admixtures in the concrete up to that moment, desired setting times, required initial strength and for how long, the workability of the existing concrete.

(2) Chemical admixtures:

(i) Adding the accelerator will be done after arriving at the construction site, which is ready to receive the concrete.

(ii) Add an accelerator of 0.5 kg and up to 10 kg for every 100 kg of cement in the concrete.

(iii) The workability of the concrete will be tested by the sensor system and visually. If it is required to increase the workability of the concrete before unloading, add 0.1% to 0.5% water-reducing admixture to improve the workability of the concrete, mix for about 2 to 5 minutes, and empty the concrete.

(iv) The accelerator will be used in cold and low ambient temperatures, usually at less than 10° C. In these cases, if the ambient temperature ranges between 5 degrees Celsius and 0 degrees and below, to prevent the water from freezing, add an accelerator in a dose of up to 25 kg per cubic meter in the stationary system. However, at a higher temperature than this, the amount of water will be reduced by the amount of water in the admixture added and the admixture at the construction site. The admixture must be mixed in the mixer at a time ranging from 0.5 to 1 min per cubic meter of concrete in the mixer.

(v) To shorten setting times at an ambient temperature above 5 degrees Celsius, to obtain faster setting times, and to get higher initial compressive strengths, an amount of 1%-10% (percentage by weight of the amount of cement based on the rate of solids) must be added. The admixture must be mixed in the mixer at a time ranging from 0.5 to 1 min per cubic meter of concrete in the mixer.

The invention claimed is:

1. A mobile, volumetric, concrete-production system for continuous production of a fresh concrete or a batched concrete mix, said system comprising:

(i) A mobile platform operated by a driver, an external operator, or an autonomous operating system for transporting components of the system;

(ii) A concrete mixer tank installed on said mobile platform for continuous mixing of said fresh concrete or said batched concrete mix contained inside the tank;

(iii) Separate compartments installed on said mobile platform for containing water and one or more chemical admixtures used for the production of the concrete;

(iv) Dispensers and flow meters for controlled and continuous measuring, dosing, and addition of said one or more chemical additives; and (v) An on-board continuous-monitoring and quality-control system;

wherein said continuous-monitoring and quality-control system comprises:

A. An imaging and sensor sub-system comprising:

(a) At least one camera installed inside the concrete mixer tank for continuously gathering visual information, thermal information, and thermal profile of said fresh concrete or said batched concrete mix at anytime before transportation, during transportation, prior to discharge and during the discharge of the concrete through a mixer trough at a construction site;

(b) An acoustic sensor installed on the mixer tank for continuously examining changes in a sound level (dB), frequency (Hz) and duration, and a sound of low and full load of the concrete inside the concrete mixer, said acoustic sensor is thus configured to monitor the workability, cohesion, homogeneity, segregation, and water separation of the concrete;

(c) A hydraulic pressure gauge for indicating a hydraulic pressure of the concrete inside the concrete mixer tank and a hydraulic load intensity on the mixer motor during loading and prior to discharge of the concrete while mixing at a high rotation frequency of the mixer tank from about 5 rpm to about 95 rpm, and during transportation while mixing at a low rotation frequency from about 1 rpm to about 4 rpm, said hydraulic pressure and hydraulic load intensity are indicators of the workability of the prepared concrete, and said hydraulic pressure gauge is thus configured to provide an indication to simulate the workability of the concrete;

(d) At least one temperature gauge for continuously monitoring and controlling the concrete temperature and surrounding temperature outside the mixed concrete, said at least one temperature gauge is thus configured to monitor a hydration progress, including the degree of hydration, rate of heat of hydration and slump or flow reduction of the concrete, and water absorption by aggregates of the concrete; and B. A timeline operation sub-system comprising a computing unit configured to:

(1) Receive an input data of concrete from a concrete plant loading the aggregates and optionally water into the concrete mixer tank, or from the driver, external operator, or autonomous operating system;

(2) Continuously receive and process data from the imaging and sensor sub-system;

(3) Generate an output data on:
    quality, consistency, workability, and stability of the concrete being produced in the mixer tank during the transportation and prior to the discharge;
    a computed volume of the concrete in the concrete mixer tank computed from an estimated volume discharged by a number of discharge rounds of the tank and by a number of empty blade spiral revolutions;
    a concrete temperature and surrounding temperature;
    sound changes that indicate drying and homogeneity of the concrete; and
    deviations from physicochemical parameters of the concrete production process; and (4) Build a course of actions for the driver, external operator or autonomous operating system in a form of computer commands to add water, a chemical dispersant and said particular one or more chemical admixtures to the concrete mixer tank, in specific amounts and at particular intervals of time as computed and indicated by the computing unit, in order to maintain or adjust the desired physicochemical parameters of the concrete production process, and quality, consistency, and stability of the produced concrete, and further perform a re-inspection.

2. The concrete-production system of claim 1, wherein said mobile platform for transporting components of said system is installed on a truck suitable for transporting said fresh concrete or said batched concrete mix inside the mixer tank to a construction site and automatically or manually discharging the concrete at the construction site.

3. The concrete-production system of claim 1, wherein said chemical admixtures are selected from the group consisting of:

(a) A chemical dispersant suitable for dispersing a concrete mixture and increasing the slump or flow level of concrete and thereby maintaining the desired slump levels of said physicochemical parameters of the concrete;

(b) A cement accelerator suitable for minimising a setting time and consequently, a cure time of the concrete, accelerating hydration of the cement binding with water, adjusting a rate and a degree of the binding reaction of the cement and the chemical additives upon mixing with water, and also preventing freezing of water in the concrete in cold areas;

(c) A viscosifier suitable for increasing viscosity of the fresh concrete or the batched concrete mix, thereby causing a reduction in water excretion (bleeding) and segregation, and increasing homogeneity of the concrete;

(d) An air entrainer surfactant for air entrapment, suitable for increasing the air content in the concrete and adjusting viscosity of the concrete; and (e) A hydration stabiliser formulated to retard the concrete production over extended periods of time.

4. The concrete-production system of claim 1, wherein said at least one camera is selected from: an imaging camera for taking images, a video camera for taking videos, and a thermal imaging camera for generating thermograms and thermal profile, the images and videos is said visual information, and the thermograms is said thermal information.

5. The concrete-production system of claim 4, wherein said thermal imaging camera is a forward looking infrared (FLIR) camera.

6. The concrete-production system of claim 1, wherein said input data of concrete are selected from one or more parameters:
    a type of concrete,
    an amount of the water added before the transportation, during the transportation, prior to the discharge and during the discharge of the concrete,
    an amount of cement added, a maximum water-to-cement ratio allowed according to the type of the concrete, types and technical characteristics of the chemical admixtures, a grading and types of the aggregates and their mix, loading times of the materials used for the production of the concrete before the transportation, during the transportation, prior to the discharge and during the discharge of the concrete, a required workability (slump or flow level) of the produced concrete, a required air percentage content data, and an intended concrete application means.

7. The concrete-production system of claim 1, wherein said physicochemical parameters of the concrete production process are selected from the group consisting of:

a slump or flow level (workability) reduction of the concrete computed from a slump simulation and continuous changes in the slump level with time;

an amount and type of said one or more chemical admixture to be added to the concrete in the mixer tank in accordance with required specifications of the prepared and mixed concrete and the properties of aggregates and cement used for the production of the concrete, in order to maintain or adjust a specified workability of the concrete to a required level without addition of water;

a bonding time with cement;

an initial and final setting times of the concrete;

a rate profile (delay or acceleration) for addition of an admixture in order to maintain or adjust to a required level of the desired concrete strength;

an air content of the concrete in the mixer tank;

a degree of hydration of the concrete to a predetermined level computed from the visual information, thermal information, and thermal profile of said concrete and computed as a fraction of cement that has fully reacted with water during the binding process;

a fineness of the produced cement upon mixing with water affecting a rate of a heat evolution of the cement in the concrete and viscosity of the concrete, said heat evolution is proportional to a change in the concrete viscosity during the concrete production process, and said parameters are used to compute a dosage amount, a number of dosages, a time interval between the dosages and a rate of addition of a hydration stabiliser into the mixer tank; and a homogeneity and consistency of the concrete including presence of the aggregates in the concrete, density and concrete colour, height, size, shape, and colour of the aggregates inside the concrete, water bleeding, and segregation of the concrete.

8. The concrete-production system of claim 1, wherein said physicochemical parameters of the concrete production process are correlated:

with an amount of water to add to the concrete in the concrete mixer tank in order to reach a required water-to-cement ratio and not to exceed this ratio; and with an amount of one or more chemical admixtures to add to the produced concrete at predetermined dosages and intervals of time, to disperse said concrete, and thereby increase the slump or flow level of the concrete to the desired slump level, without adding water.

9. The concrete-production system of claim 1, wherein the on-board continuous-monitoring and quality-control system is designed to be operated manually or remotely by the driver, external operator, or autonomous operating system.

10. The concrete-production system of claim 1, wherein the on-board continuous-monitoring and quality-control system is designed to be operated by the autonomous operating system with an embedded artificial intelligence based on machine-learning models, without an external control or intervention from the driver or the operator.

11. The concrete-production system of claim 10, wherein upon applying the machine-learning model on the input data in the computing unit, the output is a single bit whose value is '0' or '1', or an array of bits, or an array of integers, or an array of complex numbers, wherein said single bit, or said array of bits, or said array of integers, or said array of complex numbers corresponds to one or more of the parameters of said generated output data, thereby providing a course of actions for the driver, the external operator or the autonomous operating system to maintain the desired physicochemical parameters of the concrete production process, and quality, consistency, and stability of the produced concrete.

12. The concrete-production system of claim 11, wherein said machine-learning models include any of the following algorithms selected from: a support vector machine (SVM) based process, a decision tree-based process, and a deep neural network (NN) process, wherein the deep neural network is one or more models of a convolutional neural network (CNN), a regional CNN (RCNN), and a long-short term memory recurrent CNN (LSTM Recurrent CNN).

13. The concrete-production system of claim 10, wherein said artificial intelligence involves a training process that includes training the machine-learning model with input data sets, each data set is based on a single time stamp and represents the predictions that will be made by the trained machine-learning model.

14. The concrete-production system of claim 13, wherein said training of the machine-learning model correlates the input data with pre-determined labels, including the quality, consistency, and stability of the concrete being produced in the mixer tank during the transportation and prior to the discharge; decrease in quality of the aggregates and change in composition of the produced concrete; a volume of the concrete in the concrete mixer tank; a concrete temperature; sound changes that indicate drying of the concrete; and deviations from physicochemical parameters of the concrete production process.

15. The concrete-production system of claim 14, wherein said machine-learning model, after being trained, predicts a set of actions, including adding said one or more chemical admixtures in specific amounts and at particular intervals of time into the mixer tank.

16. The concrete-production system of claim 1, wherein said imaging and sensor sub-system further comprises an imaging or video camera installed on the mobile platform outside the concrete mixer tank, for monitoring events and activities outside the mixer truck.

17. The concrete-production system of claim 16, wherein said events and activities outside the mixer truck comprises activities of factory and construction personnel, factory and laboratory workers and engineers taking samples of the discharged concrete for determining quality of the concrete, and an operator and driver of the mobile platform.

18. The concrete-production system of claim 1, wherein said imaging and sensor sub-system further comprises a tachometer or a revolutions-per-minute (RPM) gauge installed on the truck for indicating a centrifugal force or rotation speed and tracking progress of the concrete mixer tank of the truck, and additional simulation of the slump level.

19. The concrete-production system of claim 1, wherein said computing unit of the timeline operation sub-system further comprises a communication module installed into or connected to the computing unit and configured to:

continuously receive and process data in a form of thermograms, images, video and audible or acoustic signals, temperature and temperature gradient, and hydraulic pressure, from said imaging and sensor subsystem, and simultaneously transmit readable information to an external storage device or user's interface in a form of text, graphics, or audible signals, and updating or alerting the user if any action on the user's side is required.

20. A method for continuous monitoring and quality control of a production of a fresh concrete or a batched concrete mix in a concrete mixer tank, said method comprising:

(a) Continuously gathering visual information, thermal information, and thermal profile of said fresh concrete or said batched concrete mix at any time before transportation, during the transportation, prior to discharge and during the discharge of the concrete through a mixer trough at a construction site with at least one camera selected from an imaging camera for taking images, a video camera for taking videos, and a thermal imaging camera for generating thermograms and thermal profile;

(b) Continuously examining changes in a sound level (dB), frequency (Hz) and duration, and a sound of low and full load of the concrete inside the concrete mixer with an acoustic sensor installed on the mixer tank and estimating a slump level (workability) of the concrete and monitor cohesion, homogeneity, segregation, and water separation of the concrete;

(c) Continuously indicating a hydraulic pressure of the concrete inside the concrete mixer tank and a hydraulic load intensity on the mixer motor with a hydraulic pressure gauge installed on the mixer tank, during loading and prior to discharge of the concrete, while mixing at a high rotation frequency of the tank from about 5 rpm to about 95 rpm, and during transportation while mixing at a low rotation frequency from about 1 rpm to about 4 rpm, thereby indicating and simulating the workability of the concrete;

(d) Continuously monitoring and controlling the concrete temperature and surrounding temperature outside the mixed concrete with a temperature gauge, thereby monitoring a hydration progress, including the degree of hydration, rate of heat of hydration and slump reduction of the concrete, and water absorption by aggregates of the concrete;

(e) Continuously indicating a centrifugal force or rotation speed and tracking progress of the concrete mixer tank with a tachometer or a revolutions-per-minute (RPM) gauge installed on the tank, thereby providing computation of a volume of the concrete in the concrete mixer tank and additionally simulating the slump level;

(f) Receiving an input data of the concrete loaded and mixed in the mixer tank from a human operator or user, or from an autonomous operating system on a computing unit;

(g) Continuously receiving and processing data from Steps (a) to (d) on the computing unit;

(h) Generating an output data on:

quality, consistency, workability, and stability of the concrete being produced in the mixer tank during the transportation and prior to the discharge;

a computed volume of the concrete in the concrete mixer tank computed from an estimated volume discharged by a number of discharge rounds of the tank and by a number of empty blade spiral revolutions;

a concrete temperature;

sound changes that indicate drying of the concrete; and deviations from physicochemical parameters of the concrete production process; and (i) Building a course of actions for the driver, external operator or autonomous operating system in a form of computer commands to add water, a chemical dispersant or said one or more chemical admixtures to the concrete mixer tank, in specific amounts and at particular intervals of time as computed and indicated by the computing unit, in order to maintain or adjust the desired physicochemical parameters of the concrete production process, and quality, consistency, and stability of the produced concrete, and further perform a re-inspection.

\* \* \* \* \*